United States Patent [19]

Chang et al.

[11] Patent Number: 5,543,932
[45] Date of Patent: Aug. 6, 1996

[54] DIGITAL VIDEO SIGNAL RECORDING APPARATUS AND DIGITAL VIDEO SIGNAL REPRODUCING APPARATUS

[75] Inventors: Ching-Fang Chang; Naofumi Yanagihara, both of Tokyo; Jun Yonemitsu; Katsumi Tahara, both of Kanagawa; Yoichi Yagasaki, Tokyo; Teruhiko Suzuki, Chiba, all of Japan

[73] Assignee: Sony Corporation, Tokyo, Japan

[21] Appl. No.: 248,176

[22] Filed: May 24, 1994

[30] Foreign Application Priority Data

May 31, 1993 [JP] Japan ................................. 5-152837
Jul. 13, 1993 [JP] Japan ................................. 5-195533

[51] Int. Cl.$^6$ ............................ H04N 5/926; H04N 5/937
[52] U.S. Cl. ................................ 358/335; 348/423; 358/312
[58] Field of Search ............................ 358/335, 312; 348/423

[56] References Cited

U.S. PATENT DOCUMENTS 5,168,356 12/1992 Acampora ........................ 370/110.1
5,239,308 8/1993 Keesen ........................ 341/67
5,377,014 12/1994 Knauer ........................ 358/335

FOREIGN PATENT DOCUMENTS

| 0501699 | 9/1992 | European Pat. Off. . |
| 0505985 | 9/1992 | European Pat. Off. . |
| 0536630 | 4/1993 | European Pat. Off. . |
| 0553949 | 8/1993 | European Pat. Off. . |
| WO91/02430 | 2/1991 | WIPO . |
| WO94/17631 | 8/1994 | WIPO . |

Primary Examiner—Howard W. Britton
Attorney, Agent, or Firm—William S. Frommer; Alvin Sinderbrand

[57] ABSTRACT

According to the present invention, when an ATV signal is recorded by a digital VCR in the conventional television signal record mode, variable speed reproduction data composed of HP data containing I frame is redundantly recorded in a surplus record area that is formed by the difference between the transmission rate of the ATV signal and the transmission rate of the conventional compressed digital video signal. When variable speed reproduction is performed, the variable speed reproduction data is reproduced.

17 Claims, 30 Drawing Sheets

| PBP | PRIORITY CLASS | DATA CONTAINED IN PRIORITY CLASS |
|---|---|---|
| 65 | 0 | SEQUENCE; GOP; ALL DATA OF PICTURE LAYER; DATA OF SLICE LAYER (UNTIL PBP) |
| 66 | 1 | MACRO-BLOCK DATA FROM MB STUFFING TO MB TYPE |
| 67 | 2 | DATA UNTIL FIRST MOTION VECTOR |
| 68 | 3 | REMAINING MOTION VECTOR |
| 0 | 4 | MACRO-BLOCK DATA FROM CBP TO DC COEFFICIENT OR FIRST COEFFICIENT (NON-ZERO) IN ZIGZAG SCANNING SEQUENCE |
| 1 | 5 | FIRST NON-ZERO COEFFICIENT PRECEDED BY DC COEFFICIENT IN ZIGZAG SCANNING SEQUENCE OR FIRST COEFFICIENT |
| 2 | 6 | SECOND NON-ZERO COEFFICIENT PRECEDED BY DC COEFFICIENT IN ZIGZAG SCANNING SEQUENCE OR FIRST COEFFICIENT |
| j | j + 4 | J-TH NON-ZERO COEFFICIENT PRECEDED BY DC COEFFICIENT IN ZIGZAG SCANNING SEQUENCE OR FIRST COEFFICIENT |

Fig. 2
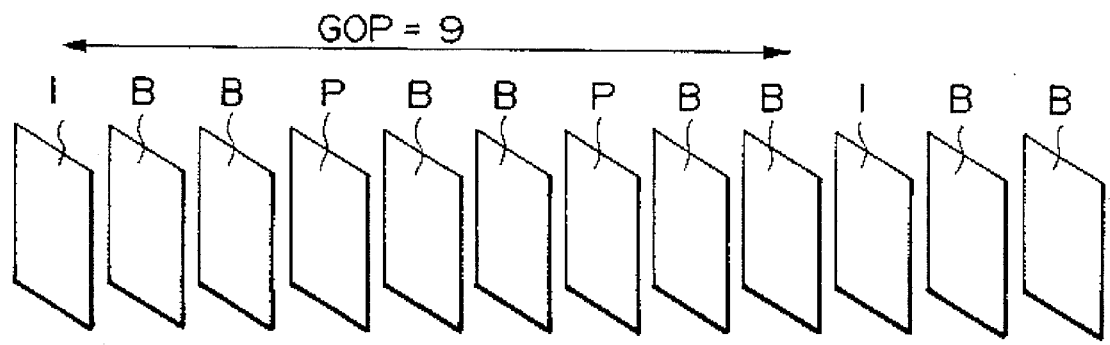
Fig. 3A
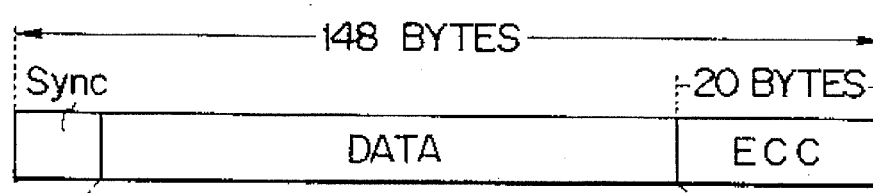
Fig. 3B
Fig. 4
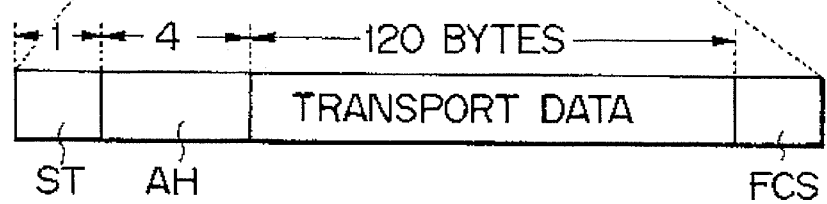

Fig.5A

| AH HEADER | | | |
|---|---|---|---|
| POINTER TO START OF SLICE | FRAME TYPE | FRAME NUMBER | SLICE NUMBER WITHIN FRAME | Q FACTOR |
| 10 BITS | 2 BITS | 5 BITS | 10 BITS | 5 BITS |

Fig.5B

| AH HEADER | | | | |
|---|---|---|---|---|
| POINTER TO START OF MACROBLOCK | FRAME TYPE | FRAME NUMBER | MACROBLOCK NUMBER WITHIN FRAME | RESERVED |
| 10 BITS | 2 BITS | 5 BITS | 13 BITS | 2 BITS |

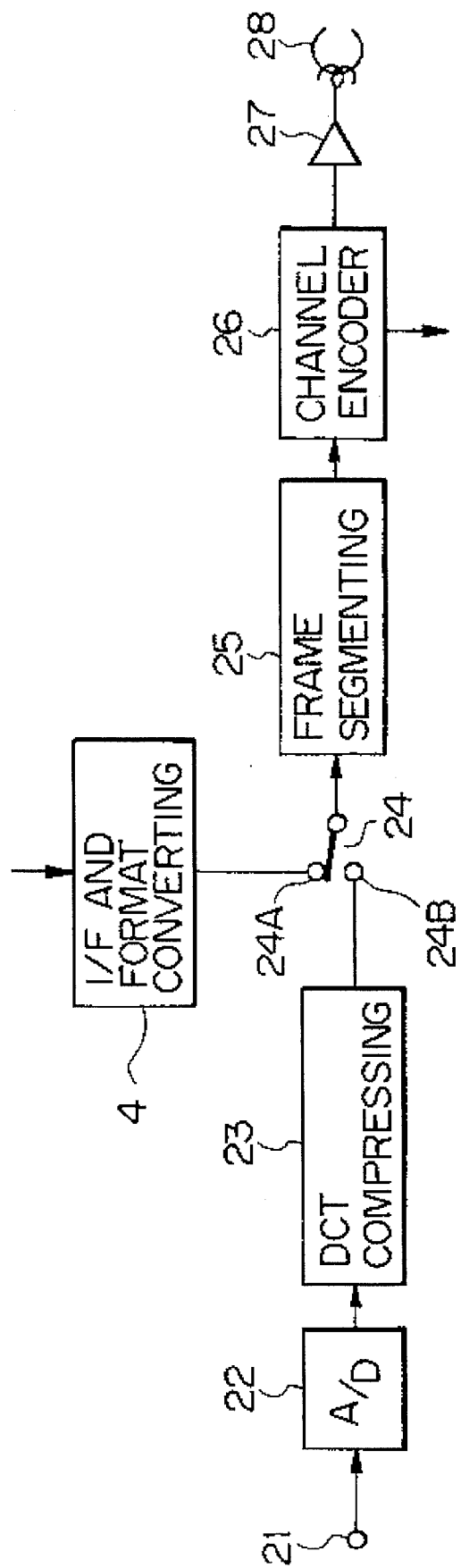

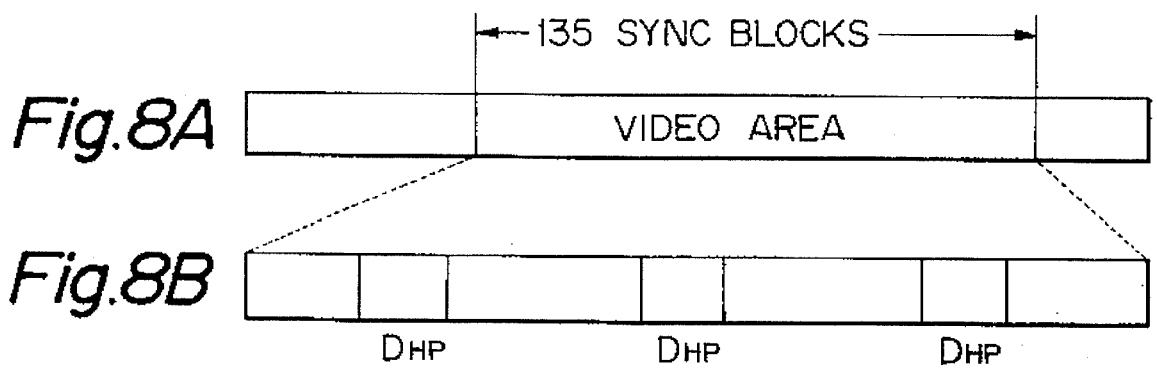
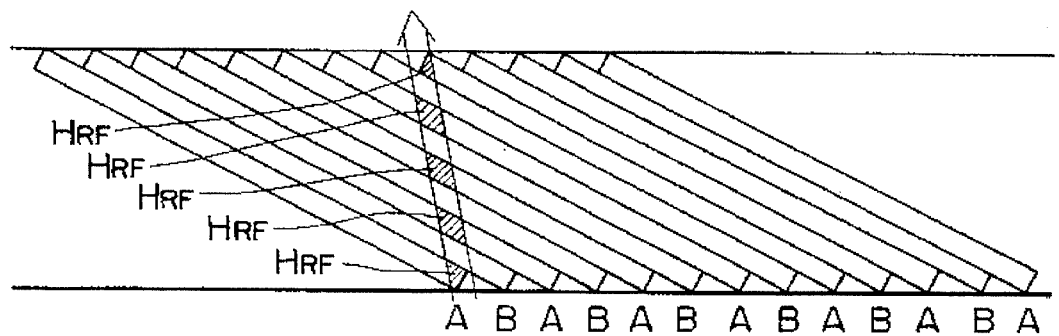
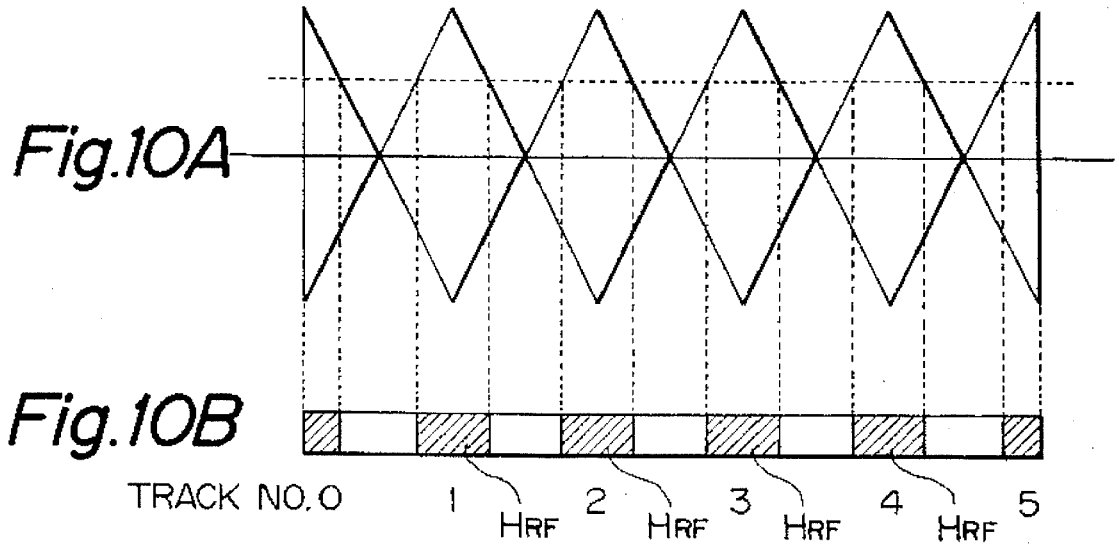

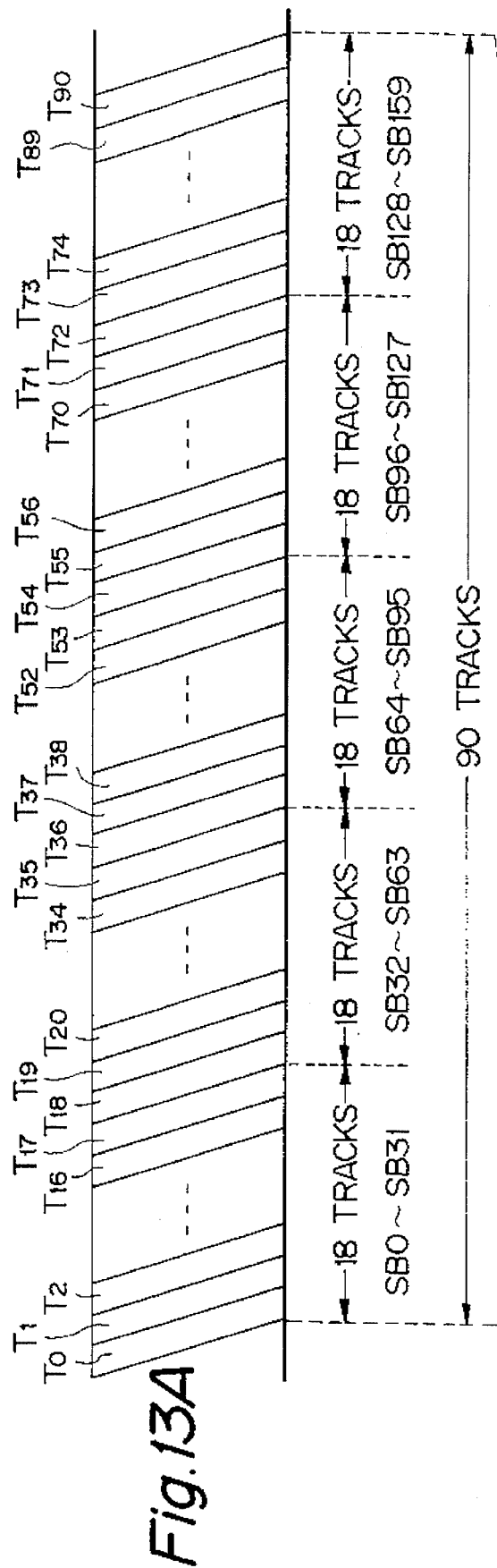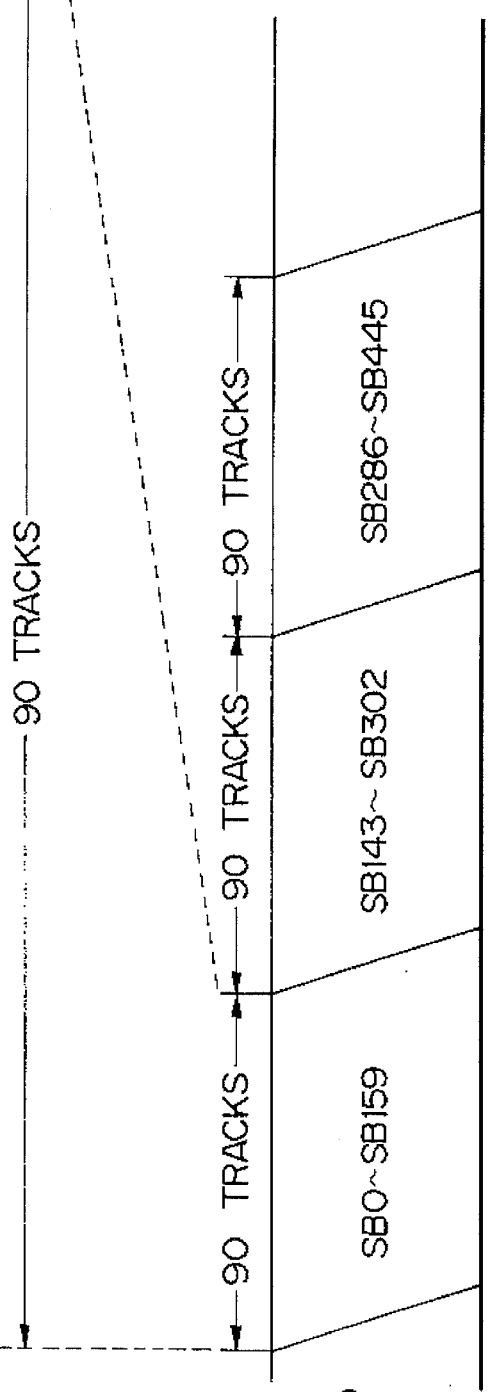

Fig. 14

| | |
|---|---|
| # i | ~ M1 |
| # i + 9 | ~ M2 |
| # i + 18 | ~ M3 |
| # i + 27 | ~ M4 |
| # i + 36 | ⋮ |
| # i + 45 | |
| # i + 54 | |
| # i + 63 | |
| # i + 72 | |
| # i + 81 | |
| # i + 90 | |
| # i + 99 | |

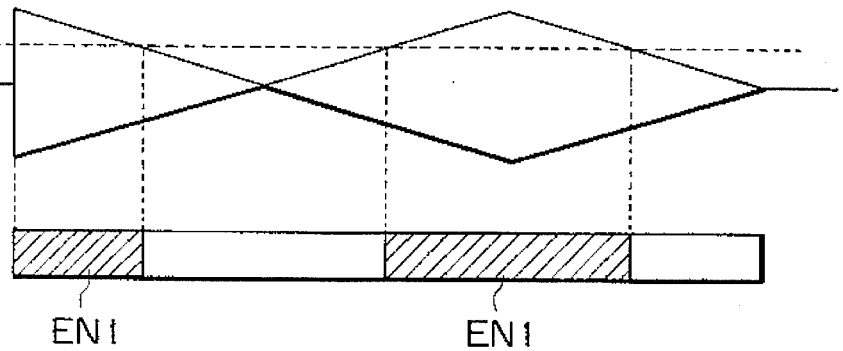
Fig.17A
Fig.17B
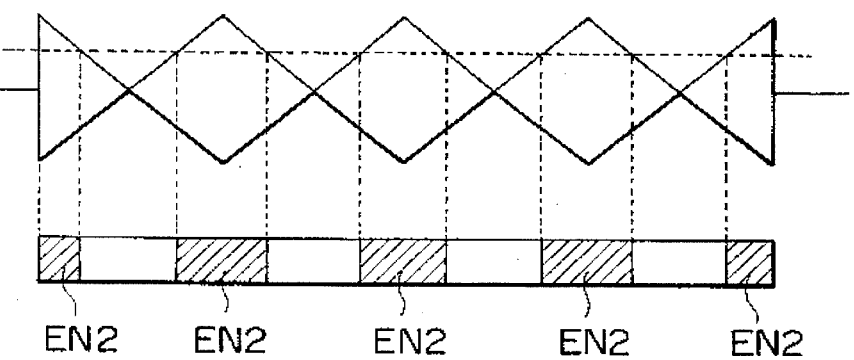
Fig.17C
Fig.17D
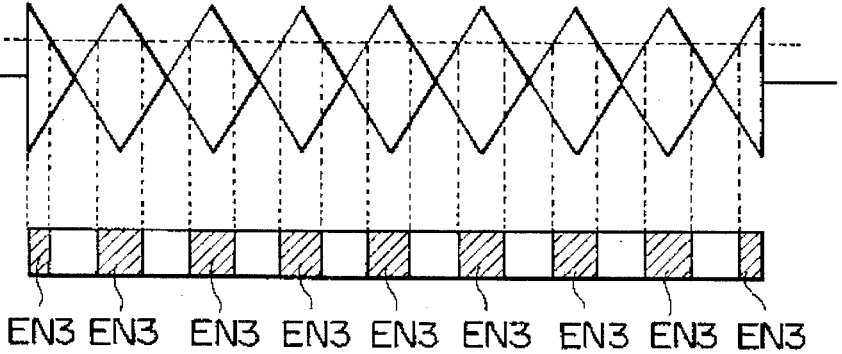
Fig.17E
Fig.17F

Fig. 23

| PBP | PRIORITY CLASS | DATA CONTAINED IN PRIORITY CLASS |
|---|---|---|
| 65 | 0 | SEQUENCE; GOP; ALL DATA OF PICTURE LAYER; DATA OF SLICE LAYER (UNTIL PBP) |
| 66 | 1 | MACRO-BLOCK DATA FROM MB STUFFING TO MB TYPE |
| 67 | 2 | DATA UNTIL FIRST MOTION VECTOR |
| 68 | 3 | REMAINING MOTION VECTOR |
| 0 | 4 | MACRO-BLOCK DATA FROM CBP TO DC COEFFICIENT OR FIRST COEFFICIENT (NON-ZERO) IN ZIGZAG SCANNING SEQUENCE |
| 1 | 5 | FIRST NON-ZERO COEFFICIENT PRECEDED BY DC COEFFICIENT IN ZIGZAG SCANNING SEQUENCE OR FIRST COEFFICIENT |
| 2 | 6 | SECOND NON-ZERO COEFFICIENT PRECEDED BY DC COEFFICIENT IN ZIGZAG SCANNING SEQUENCE OR FIRST COEFFICIENT |
| j | j+4 | J-TH NON-ZERO COEFFICIENT PRECEDED BY DC COEFFICIENT IN ZIGZAG SCANNING SEQUENCE OR FIRST COEFFICIENT |

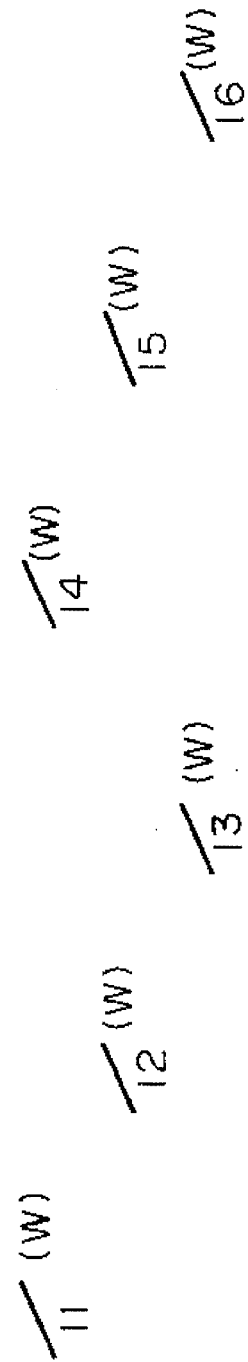
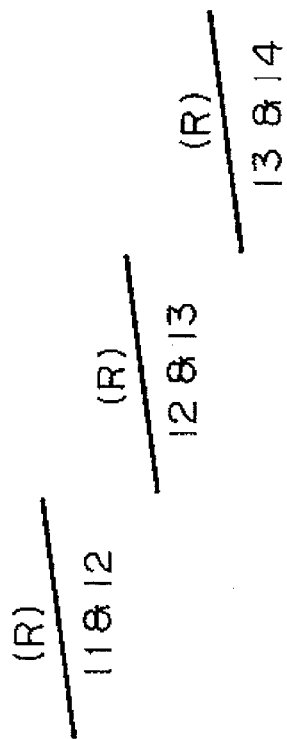
Fig.37A
Fig.37B
Fig.37C
Fig.37D
Fig.37E
Fig.37F
Fig.37G 5,543,932

DIGITAL VIDEO SIGNAL RECORDING APPARATUS AND DIGITAL VIDEO SIGNAL REPRODUCING APPARATUS

BACKGROUND OF THE INVENTION

1. Field of the Invention

The present invention relates to a digital video signal recording apparatus and a digital video signal reproducing apparatus for directly recording and reproducing an ATV (Advanced Television) signal to and from a magnetic tape through a rotating head signal, in particular, to an improvement of variable speed reproduction.

2. Description of the Prior Art

Digital VCRs that perform a DCT (Discrete Cosine Transform) operation for an input digital video signal, compress the DCT code into variable length code, and record the compressed code on a magnetic tape through a rotating head are known.

Such digital VCRs have a ST mode (where a video signal corresponding to a conventional television system such as NTSC system is recorded) and a HD mode (where a HDTV signal is recorded). In the ST mode, the video signal is compressed at around 25 Mbps and recorded. In the HD mode, the video signal is compressed at around 50 Mbps and recorded.

As described above, when a HDTV signal is recorded by a digital VCR, the HDTV signal is compressed in the HD mode. However, in the full digital system as with AD-HDTV system, since a signal is compressed and transmitted, the transmitted signal can be directly recorded by a digital VCR. When the received signal is directly recorded by the digital VCR, it is not necessary to decode the HDTV signal from the received signal, compress the HDTV signal, or encode the HDTV signal so as to input the HDTV signal to the digital VCR. Thus, the hardware resource can be reduced.

Such a system has been proposed as an ATV (Advanced Television) system where all processes including a signal process and a signal transmission process are performed with digital signals. As an eminent system of the ATV system, the AD-HDTV system is known. In the AD-HDTV system, a HDTV signal is compressed as a packet corresponding to an image compression technique based on MPEG (Moving Picture Image Coding Experts Group), which is an international standard of moving image.

FIG. 1 is a block diagram showing a construction of a transmission system of the AD-HDTV system. In FIG. 1, reference numeral 101 is a video compression encoder. Reference numeral 102 is an audio encoder. A video signal of the HDTV system is supplied to the video compression encoder 101 through an input terminal 103. An audio signal is supplied to the audio encoder 102 through an input terminal 104.

The video compression encoder 101 compresses the HDTV signal corresponding to a system based on the MPEG system.

In otherwords, the video compression encoder 101 compresses the HDTV signal corresponding to a high efficient encoding system that is a combination of DCT operation and moving compensating operation. As shown in FIG. 2, the video compression encoder 101 outputs an in-frame encoded frame (referred to as an I frame), a forward prediction encoded frame (referred to as a P frame), and a bidirectional prediction encoded frame (referred to as a B code) in a predetermined order. The I frame is independently transformed into a DCT code without the use of the correlation against other frames. On the other hand, the P frame is not directly transformed into a DCT code. Instead, the motion of the P frame is compensated and predicted corresponding to the preceding I frame or the preceding P frame. The difference signal between these frames is transformed into a DCT code. In the case of the B frame, the motion of the B frame is compensated and produced corresponding to the preceding and following I frames or P frames. The difference signal between these frames is transformed into a DCT code. The period in which the I frame takes place is referred to as GOP (Group of Picture). In this example, GOP is 9.

In FIG. 1, reference numeral 105 is a priority encoder. The priority encoder 105 allocates priorities to compressed HDTV signal data. An example of the priorities is as follows.

I frame 1. Frame header 2. Slice header 3. Macro-block address, type, quantizing step 4. DC value 5. Low frequency coefficient 6. High frequency coefficient P and B frames 1. Frame header 2. Slice header 3. Macro-block address, type, quantizing step 4. Motion vector 5. DC value 6. Low frequency coefficient 7. High frequency coefficient In the I frame, the frame header has the highest priority. In the order of—slice header,—macro-block address, type, and quantizing step,—DC value,—low frequency coefficient, and—high frequency coefficient, their priorities lower. In the P and B frames, in the order of—frame header,—slice header,—macro-block address, type, and quantizing step,—motion vector,—DC value,—low frequency coefficient, and—high frequency coefficient, their priorities lower.

Reference numeral 106 is a transport encoder. The transport encoder 106 generates a packet corresponding to video data, whose priority is allocated by the priority encoder 105, audio data encoded by the audio encoder 104, and additional information received from an input terminal 107. There are high priority packets and low priority packets. The high priority packets are referred to as HP (High Priority) packets, whereas the low priority packets are referred to as SP (Standard Priority) packets. The ratio between an HP packet and an SP packet is 1 to 4. In a normal image, the frame header, the slice header, the macro-block address, type, and quantizing step, the DC value, and the low frequency coefficient of the I frame are transmitted with an HP packet. On the other hand, the frame header, the slice header, the macro-block address, type and quantizing step, and the motion vector of the P frame and the B frame are transmitted with an HP packet. The HP packet is transmitted with a carrier having a high output power, whereas the SP packet is transmitted with a carrier having a low output power.

FIG. 3 is a schematic diagram showing a construction of a packet. As shown in FIG. 3A, the length of a transmission packet is 148 bytes. A sync is placed at the beginning of the packet. The sync is followed by transmission data and an error correction parity.

FIG. 3B shows transmission data in detail. A service type ST is placed at the beginning of the transmission data. As shown in FIG. 4, the service type ST contains information P, identification information ID, and a counter CC. The information P represents whether the packet is an HP packet or an SP packet. The identification information ID represents transmission data as video data or audio data. The counter CC counts a value from 0 to 15.

The service type ST is followed by an after header AH. FIG. 5A shows an after header of an HP packet. FIG. 5B shows an after header of an SP packet. The after header AH of the HP packet includes a slice start pointer, a frame type, a frame number, a slice number of the frame, and a quantizing factor. The slice start pointer represents the first bit of the input point of transmission data. The after header AH of the SP packet contains a start pointer of a macro-block, a frame type, a frame number, and a macro-block number of the frame.

In FIG. 1, reference numeral 108 is a channel modulator. An HP packet and an SP packet generated by the transport encoder 106 are supplied to a channel modulator 108. The channel modulator 108 modulates the HP packet and the SP packet with two carriers. The output of the channel modulator 108 is supplied to an output terminal 109.

In the AD-HDTV system, by the above-described image compression technique, HDTV signals are transmitted at a transmission rate of 17.4 Mbps. This transmission rate is lower than the record rate in the SD mode of the digital VCR (approximately, 25 Mbps). Thus, signals transmitted in the AD-HDTV system are directly recorded in the SD mode of the digital VCR. When the transmitted signals are directly recorded by the digital VCR, it is not necessary to decode the HDTV signals corresponding to the transmitted signals and input the decoded signals to the digital VCR. Thus, the hardware resource can be reduced. In addition, since the HDTV signals are recorded in the SD mode, the recording time can be prolonged.

However, when the AD-HDTV signals are directly recorded in the SD mode to the digital VCR, the variable speed reproduction cannot be properly performed because of the following reason.

As described above, in the AD-HDTV system, the HDTV signals are compressed corresponding to the MPEG system. In this system, the I frame, which is in-frame encoded, the P frame, which is forward prediction encoded, and the B frame, which is bidirectional prediction encoded, are transmitted. In the variable speed reproduction mode, since the head traverses tracks, continuous frame data cannot be obtained. Thus, data of the P frame and B frame cannot be decoded. Only data of the I frame can be decoded. Data of an I frame is transmitted with an HP packet. Thus, when only data of the I frame is used, the variable speed reproduction can be performed.

When signals corresponding to the AD-HDTV system are directly recorded by the digital VCR, HD packets, which contain the I frames, cannot be satisfactorily obtained in the variable speed reproduction mode. In addition, since the positions of the data of the I frames are not obtained, the data of the I frames equivalent to particular portions of a screen are lost. These portion of the screen may not be updated for a while. Thus, the image quality in the variable speed reproduction mode may be deteriorated.

In such a digital VCR, three types of head constructions are available. In a first construction, two heads with different azimuth angles are disposed in an opposite relation (at an interval of 180°). In a second construction, a double-azimuth head that is constructed of two heads with different azimuth angles is disposed at one position. In a third construction, two double-azimuth heads, each of which is constructed of two heads with different azimuth angles, are disposed in an opposite related (at an interval of 180°). Thus, in the third construction, four heads are used.

As described above, a reproduction valid area which is fixed in the variable speed reproduction mode is used as a surplus record area. HP packet data is recorded in the surplus record area. However, depending on the head construction, some tracks may be not traced by any head. Thus, even if the HP packet data is recorded in the surplus record areas of such tracks, data recorded on these tracks are not reproduced in the variable speed reproduction mode. Thus, since the HP packet data which are recorded on such tracks cannot be reproduced, the HP packet data are lost. Consequently, the reproduced image may be disordered.

OBJECTS AND SUMMARY OF THE INVENTION

Thus, an object of the present invention is to provide a recording and reproducing apparatus that directly records an HDTV signal transmitted in full digital system without deterioration of image quality in variable speed reproduction mode.

Another object of the present invention is to provide a recording method and a recording apparatus that directly record an HDTV signal transmitted in full digital system without deterioration of image quality in variable speed reproduction mode regardless of head construction.

A first aspect of the present invention is a digital video signal recording apparatus for directly recording a compressed transmission image signal on a magnetic tape, the image signal being divided into an in-frame encoded frame and a forward or bi-directional predict encoded frame that are categorized as a high priority packet and a standard priority packet, data of the in-frame encoded frame being contained in the high priority packet, comprising a surplus record area forming means for causing the transmission rate of the high priority data to be lower than the transmission rate of the conventional compressed digital video signal so as to form a surplus record area, and a recording means for redundantly recording the high priority data in the surplus area formed by the surplus record area forming means.

The surplus record area is preferably formed in a reproduction valid area that is fixed in a variable speed reproduction.

The high priority packet data is preferably redundantly recorded in the surplus record area for successive n tracks when the variable speed reproduction is performed at n times higher speed.

The position of the high priority packet data recorded in the surplus record area is preferably shifted whenever the in-frame encoded frame is received.

A second aspect of the present invention is a digital video signal recording apparatus for directly recording a compressed transmission image signal on a magnetic tape, comprising a dividing means for dividing the image signal into high priority data and standard priority data, a surplus record area forming means for causing the transmission rate of the high priority data to be lower than the transmission rate of the conventional compressed digital video signal so as to form a surplus record area, and a recording means for recording the high priority data in the surplus area formed by the surplus record area forming means.

A third aspect of the present invention is a digital video signal reproducing apparatus for reproducing a digital video signal from a magnetic tape, high priority packet data and standard priority packet data being recorded on the magnetic tape, each track of the magnetic tape having a surplus record area, the high priority packet data being recorded in the surplus record area, comprising a reproducing means for reproducing the high priority packet data recorded in the surplus record area in a variable speed reproduction.

A fourth aspect of the present invention is a digital video signal recording method for redundantly recording high priority packet data of a compressed transmission image signal to a surplus record area, the surplus record area being formed by the difference between the transmission rate of the compressed transmission image signal and the transmission rate of a conventional compressed digital video signal, comprising the steps of recording one of two high priority packet data sets to 2n (where n is a magnification of variable speed reproduction) tracks with a first azimuth angle, and recording the other high priority packet data set to 2n tracks with a second azimuth angle.

A fifth aspect of the present invention is a digital video signal recording apparatus for directly recording a compressed transmission image signal on a magnetic tape, comprising a surplus record area forming means for causing the transmission rate of the high priority data to be lower than the transmission rate of the conventional compressed digital video signal so as to form a surplus record area, a means for redundantly recording the high priority data in the surplus area formed by the surplus record area forming means, a means for recording one of two high priority packet data sets to 2n (where n is a magnification of variable speed reproduction) tracks with a first azimuth angle, and a means for recording the other high priority packet data set to 2n tracks with a second azimuth angle.

When the ATV signals compressed in full digital system are recorded in the conventional television signal record mode (SD mode) by the digital VCR, since the transmission rate of the ATV signals is lower than the source rate of the SD mode of the digital VCR, a surplus record area is formed. When the HD packet data including the I frame is redundantly recorded in the surplus record area, the probability for extracting the HD packet data including the I frames in the variable speed reproduction mode increases, thereby improving the image quality in the variable speed reproduction mode.

The redundant record area for the HD packet data is allocated to a reproduction valid area where the relation between the head position and the track position is fixed. Thus, the HP packet data including the I frame data can be securely reproduced, thereby improving the image quality in the variable speed reproduction mode.

In addition, HP packet data of 32 sync blocks per track is redundantly recorded for 18 tracks. The record position of the HP packet data is shifted every 90 tracks. Thus, the entire image is updated in the variable speed reproduction mode, thereby improving the image quality in the variable speed reproduction mode.

BRIEF DESCRIPTION OF THE DRAWINGS

FIG. 2 is a schematic diagram for explaining a GOP construction in the AD-HDTV system;

FIGS. 3A and 3B are schematic diagrams showing a construction of a transmission packet in the AD-HDTV system;

FIG. 4 is a schematic diagram showing a construction of a transmission packet in the AD-HDTV system;

FIGS. 5A and 5B are schematic diagrams showing constructions of transmission packets in the AD-HDTV system;

FIG. 7 is a block diagram showing a construction of a recording system of the digital VCR according to the present invention;

FIGS. 8A and 8B are schematic diagrams for explaining a redundant HP area according to the first embodiment of the present invention;

FIG. 9 is a schematic diagram for explaining an redundant HP area according to the embodiment of the present invention;

FIGS. 10A and 10B are schematic diagrams showing the relation between a redundant HP area and a reproduction RF signal according to the first embodiment of the present invention;

FIGS. 13A and 13B are schematic diagrams for explaining extraction of HP packet data according to the first embodiment of the present invention;

FIG. 14 is a schematic diagram for explaining a screen in a variable speed reproduction mode according to the first embodiment of the present invention;

FIGS. 17A to 17F are schematic diagrams showing the relation between reproduction waveform and reproduction valid area in the variable speed reproduction mode according to the first embodiment of the present invention;

FIG. 23 is a schematic diagram for explaining the third embodiment of the present invention;

FIGS. 37A to 37G are timing charts for explaining a format converting portion according to the fifth embodiment of the present invention.

DETAILED DESCRIPTION OF THE PREFERRED EMBODIMENTS

Figure 1:
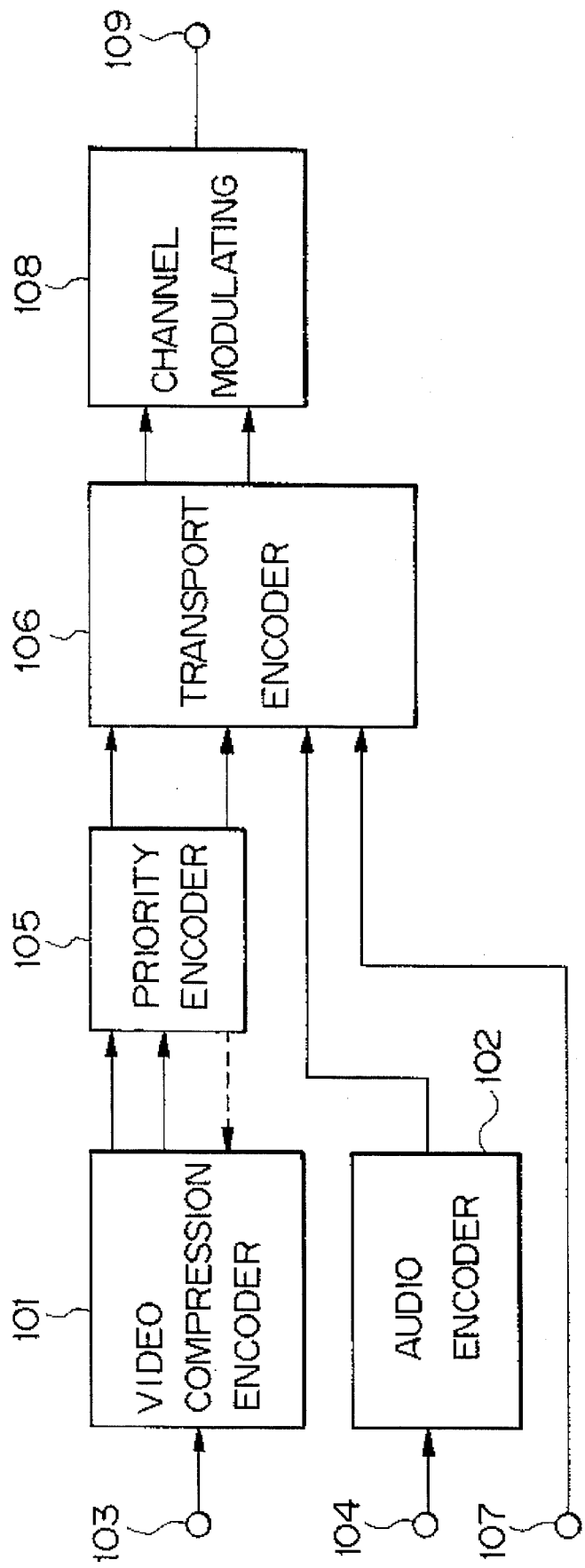
FIG. 1 is a block diagram showing a construction of a transmitting system of an AD-HDTV system.
Figure 6:
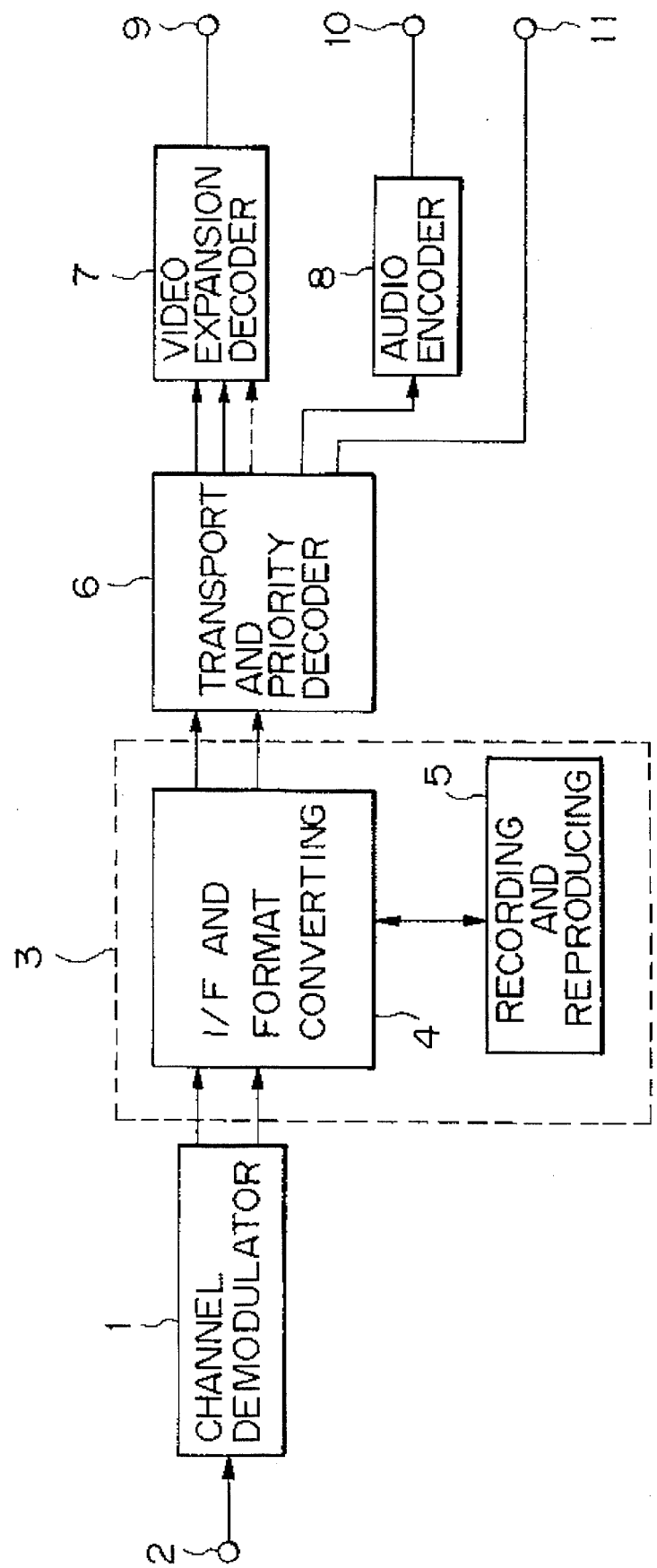
FIG. 6 is a block diagram showing a video recording system according to a first embodiment of the present invention.

Next, with reference to the accompanying drawings, embodiments of the present invention will be described. FIG. 6 is a block diagram showing a construction of a video recording and reproducing system according to a first embodiment of the present invention. In FIG. 6, reference numeral 1 is a channel demodulator. The channel demodulator 1 receives transmission data of AD-HDTV system from an input terminal 2. The channel demodulator 1 demodulates the transmission data into a packet. There are HP packets and SP packets. Important data is transmitted with the HP packets, whereas non-important data is transmitted with the SP packets.

Reference numeral 3 is a digital VCR. The digital VCR 3 has an interface and format converting portion 4 and a recording and reproducing portion 5. The HP packets and the SP packets are supplied to the transport and priority decoder 6 and the recording and reproducing portion 5 through the interface and format converting portion 4. The recording and reproducing portion 5 records data received from the interface and format converting portion 4 through a rotating head. In addition, the interface and format converting portion 4 formats the data to be supplied to the recording and reproducing portion 5 so that record data can be properly reproduced in variable speed reproduction mode. This operation will be described later.

The recording and reproducing portion 5 compresses a digital video signal corresponding to DCT and variable length encoding techniques and records the compressed data on a magnetic tape. The recording and reproducing portion 5 has an SD mode and an HD mode. In the SD mode, the recording and reproducing portion 5 records a video signal corresponding to the NTSC system or the like. In the HD mode, the recording and reproducing portion 5 records an HDTV signal. When transmission data according to the AD-HDTV system is demodulated and directly recorded on the magnetic tape, the SD mode is used. In the SD mode, the source rate is 24.3 Mbps.

The transport and priority decoder 6 performs an error correction for an HP packet and an SP packet and extracts transmission data and additional data from the HP packet and the SP packet. In a normal image, data ranging from the header to the low frequency coefficient of the I frame and data ranging from the header to the motion vector of each of the P and B frames are transmitted with an HP packet. Other data are transmitted with an SP packet.

Reference numeral 7 is a video expansion decoder. Reference numeral 8 is an audio decoder. The video expansion decoder 7 decodes Huffman code and inversely transforms DCT code corresponding to the MPEG system so as to expand the received data and form an HDTV base band signal. The output of the transport and priority decoder 6 is supplied to the video expansion decoder 7 and the audio decoder 8. The video expansion decoder 7 expands the transmission data so as to form an HDTV signal. The HDTV signal is output from an output terminal 9. The audio decoder 8 decodes audio data. The audio data is output from an output terminal 10. Additional information is output from the transport and priority decoder 6 to an output terminal 11.

FIG. 7 is a block diagram showing a construction of a recording system of the recording and reproducing portion 5 of the VCR according to the first embodiment of the present invention. In FIG. 7, reference numeral 21 is an input terminal for video signals corresponding to the conventional television system such as NTSC system or the like or HDTV system. A video signal corresponding to the conventional television system or a component video signal corresponding to the HDTV system is supplied to an input terminal 21. The component video signal is supplied to an A/D converter 22. The A/D converter 22 converts the component video signal into a digital signal.

Reference numeral 23 is a DCT compressing circuit. The DCT compressing circuit 23 compresses the input video signal corresponding to the DCT technique and the variable length encoding technique. The output of the A/D converter 22 is supplied to a DCT compressing circuit 23. The component video signal supplied from the A/D converter 22 is block-segmented and shuffled so as to perform the DCT operation. The DCT encoded data is buffered with a predetermined buffer amount. The total code amount of the predetermined buffer amount is estimated. An optimum quantizing table is determined so that the total code amount is equal to or less than a predetermined value. The DCT encoded data is quantized corresponding to the optimum quantizing table. Thereafter, the quantized data is encoded into variable length code and frame segmented.

Reference numeral 24 is a switch circuit that selects a transmission signal corresponding to the AD-HDTV system or a video signal received from the input terminal 21. The signal corresponding to the AD-HDTV system is supplied to a terminal 24A of the switch circuit 24 through the interface and format converting portion 4. The output of the DCT compressing circuit 23 is supplied to a terminal 24B of the switch circuit 24. When the signal corresponding to the AD-HDTV system is recorded, the switch 24 is connected to the terminal 24A. When the video signal received from the input terminal 21 is recorded, the switch circuit 24 is connected to the terminal 24B.

Reference numeral 25 is a frame segmenting circuit. The frame segmenting circuit 25 develops the record data into predetermined sync blocks. In addition, the frame segmenting circuit 25 performs an error correction encoding operation for the sync blocks.

Reference numeral 26 is a channel encoder. The output of the switch circuit 24 is supplied to the channel encoder 26. The output of the channel encoder 26 is supplied to a rotating head 28 through a recording amplifier 27. The rotating head 28 records the video signal received from the input terminal 21 or the signal corresponding to the AD-HDTV system on the magnetic tape (not shown).

For example, there are four rotating heads 28. In the SD mode, two of the four rotating heads 28 are used. In the HD mode, all the four rotating heads 28 are used. In the HD mode, the running speed of the magnetic tape is twice higher than the running speed of the magnetic tape in the SD mode. A rotating drum is rotated at 150 Hz regardless of the SD mode and the HD mode. Thus, when the field frequency is 60 Hz, in the SD mode, one frame is recorded with 10 tracks. In the HD mode, one frame is recorded with 20 tracks.

When the signal corresponding to the AD-HDTV system is recorded, the switch circuit 24 is connected to the terminal 24A. Thus, the signal corresponding to the HDTV system received through the interface and format converting portion 4 is frame segmented by the frame segmenting circuit 25. The frame-segmented signal is modulated by the channel encoder 25. The modulated signal is recorded by the rotating head 27 on the magnetic tape.

When the video signal received from the input terminal 21 is recorded, the switch circuit 24 is connected to the terminal 24B. Thus, the video signal received from the input terminal 21 is compressed by the DCT compressing circuit 23. The compressed signal is frame-segmented by the frame segmenting circuit 25. The frame-segmented signal is modulated by the channel encoder 26. The modulated signal is recorded by the rotating head 27 on the magnetic tape.

When the signal corresponding to the AD-HDTV system is recorded, the interface and format converting portion 4 redundantly records data of HP packets so as to improve the image quality in the variable speed reproduction mode. In addition, the interface and format converting portion 4 allocates the data to positions so as to securely extract the data of the HP packets in the variable speed reproduction mode.

In other words, the source rate in the SD mode of the digital VCR is 24.3 Mbps, whereas the transmission rate of the signal corresponding to the AD-HDTV system is 17.4 Mbps. Thus, when the signal corresponding to the AD-HDTV system is recorded in the SD mode, a surplus record area takes place. To improve the image quality in the variable speed reproduction mode, when the signal corresponding to the AD-HDTV system is recorded, data of HP packets are redundantly recorded in the surplus area. In the SD mode, data of 135 sync blocks can be recorded to one track. In the AD-HDTV system, the ratio between an HP packet and an SP packet is 1 to 4. The transmission rate of a signal corresponding to the AD-HDTV system is 17.4 Mbps. The source rate in the SD mode of the digital VCR is 24.38 Mbps. Thus, the number of sync blocks of an HP packet on one track is given as follows.

$$135 \times (17.4/24.3) \times (1/5) = 19.333 \text{ (sync blocks)}$$

Thus, the number of sync blocks is approximately 20. The number of sync blocks of an SP packet on one track is given as follows.

$$20 \times 4 = 80 \text{ (sync blocks)}$$

Thus, the number of sync blocks not used in 135 sync blocks on one track is given as follows.

$$135 - 20 - 80 = 35 \text{ (sync blocks)}$$

Thus, the HP packet can be redundantly recorded for up to 35 sync blocks on one track.

In other words, as shown in FIG. 8A, data of 135 sync blocks can be recorded at a video area of one track. In this example, as shown in FIG. 8B, redundant HP areas $D_{HP}$ are disposed at for example three positions of one track. Data of the HP packet is redundantly recorded in the three redundant HP areas $D_{HP}$ for eg. 32 sync blocks.

When the relation between head trace positions and track positions is always kept equal, the reproduction areas of one track are fixed. Reproduction valid areas are fixed on one track. The redundant HP areas $D_{HP}$ are allocated to the reproduction valid areas.

As shown in FIG. 9, when the variable speed reproduction is performed, the head traverses tracks on the magnetic tape. Thus, a reproduction signal as shown in FIG. 10A is obtained. As shown in FIG. 10B, when the relation between head trace positions and track positions is always kept equal, positions $H_{RF}$ where the reproduction signal is satisfactorily obtained are fixed. The redundant HP areas are disposed at the positions $H_{RF}$ where the reproduction signal is satisfactorily obtained.

As described above, in the SD mode of the digital VCR, one frame is recorded with 10 tracks. In the AD-HDTV system, GOP, which is one period of the I frame, is 9 frames. Thus, data of 1 GOP is normally recorded to 90 tracks. In data of 1 GOP, only an I frame is important. The I frame is one frame in 1 GOP.

Figure 11:
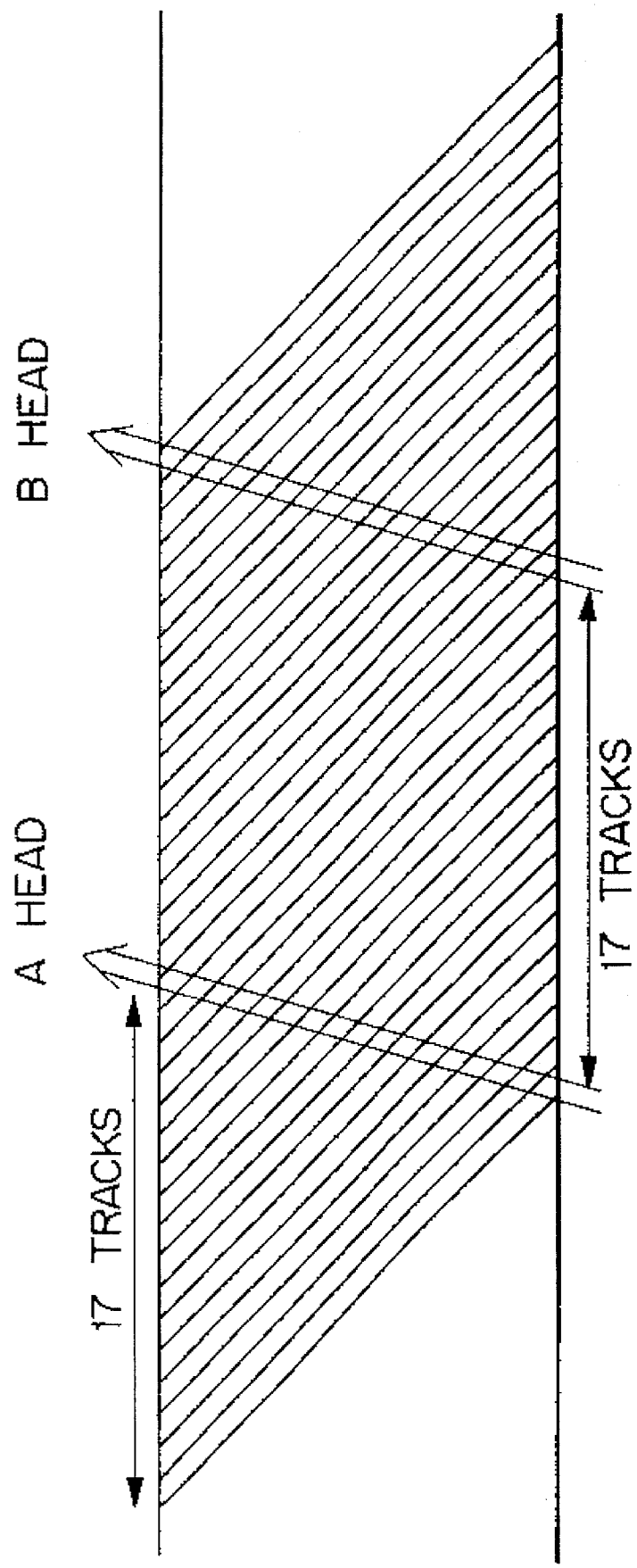
FIG. 11 is a schematic diagram showing a head trace in 17 times higher speed mode according to the first embodiment of the present invention.

FIG. 11 is a schematic diagram showing heads that scan tracks at 17 times higher speed in the variable speed reproduction mode. When an odd number 17 as a multiplication of reproduction speed is selected, the number of redundant HP areas that head A scans becomes the same as the number of redundant HP areas that the head B scans. As is clear from FIG. 11, when the same data is recorded to the redundant HP areas on 17 tracks, the data can be reproduced by the head A or the head B.

However, since the period of 1 GOP is 90 tracks, the number of tracks on which the same data is recorded is preferably allocated to a divisor of 90. In this embodiment, the same data is recorded on 18 tracks, which is a divisor of 90 tracks.

When the capacity of the redundant HP areas per track is 32 sync blocks, the total capacity of the redundant HP areas for 90 tracks, which is the period of 1 GOP, is given as follows.

$$32 \times 90 = 2880 \text{ sync blocks}$$

When the same data is recorded on 18 tracks, the capacity of an HP packet recorded in the redundant HP areas for 90 tracks, which is the period of 1 GOP, is given as follows.

$$2880 / 18 = 160 \text{ sync blocks}$$

The HP packet data for 160 sync blocks are recorded on 90 tracks with a redundancy of 18 tracks.

Now assume that all data transmitted with the HP packet are I frame data. In addition, assume that the number of sync blocks per track is 135; the number of tracks of the period of 1 GOP is 90; the source rate of the SD mode is 24.3 Mbps; the transmission rate of a signal corresponding to the AD-HDTV system is 17.4 Mbps; and the ratio between an HP packet and an SP packet is 1 to 4. In these conditions, the number of sync blocks of the I frame data is given as follows.

$$135 \times 90 \times (17.4 / 24.3) \times 0.2 = 1740 \text{ sync}$$

blocks Part (160 sync blocks) of 1740 sync blocks are recorded on 90 tracks, which is the period of 1 GOP.

Figure 12A:
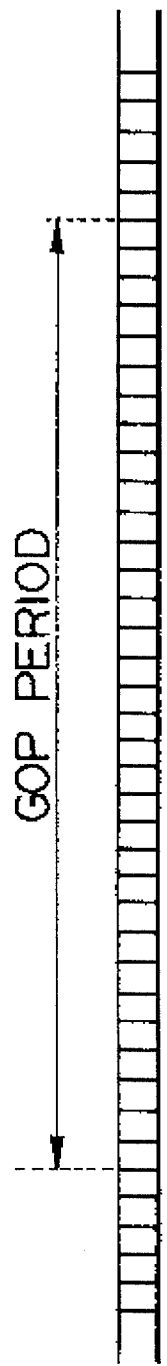
FIGS. 12A to 12D are timing charts for explaining extraction of HP packet data according to the first embodiment of the present invention.
Figure 12B:
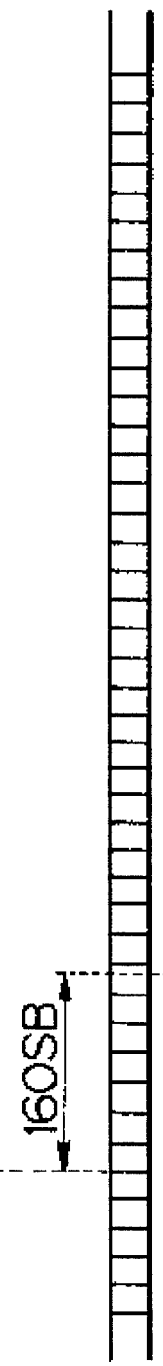
Figure 12C:
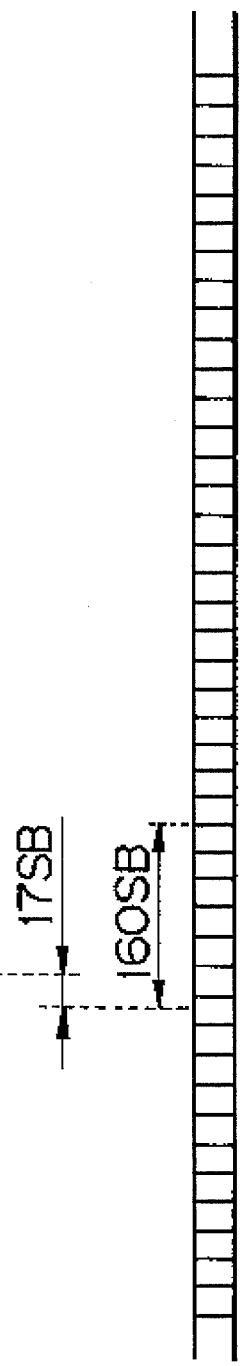
Figure 12D:
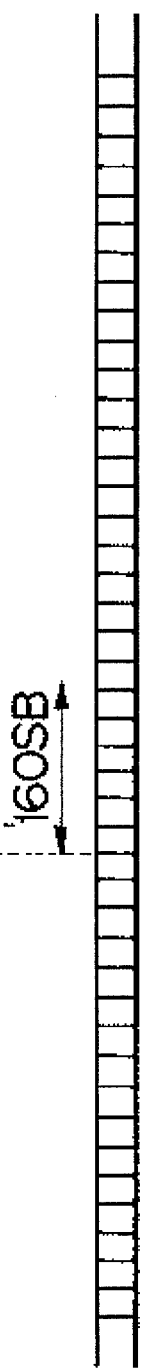

HP packet data equivalent to 160 sync blocks recorded on 90 tracks, which is the period of 1 GOP, are shifted every 90 tracks. FIGS. 12A to 12D are schematic diagrams showing redundant HP areas in the period of 1 GOP. As shown in FIG. 12B, HP packet data for 160 sync blocks are stored in memory in the period of 1 GOP. The HP packet data for 160 sync blocks stored in the memory are recorded on 90 tracks so that 32 sync blocks per track are redundantly recorded for 18 tracks. In the next period of GOP, as shown in FIG. 12C, 160 sync blocks are stored from the 143th sync block of the first GOP. Thus, 160 sync blocks are stored with a redundancy of 17 sync blocks. 32 sync blocks per track are recorded in the redundant HP areas with a redundancy of 18 tracks. Since data corresponding to the MPEG2 system is variable length encoded, even if the code length varies, pixels are not lost on the reproduced screen.

As shown in FIG. 13, an HP packet is redundantly recorded. As shown in FIG. 13A, data of sync blocks SB0 to SB31 of 160 sync blocks are recorded in redundant HP areas on the tracks $T_0$ to $T_{17}$. Data of sync blocks SB32 to SB63 are recorded in the redundant HP areas on the tracks $T_{18}$ to $T_{35}$. Data of sync blocks SB64 to SB95 are recorded in the redundant HP areas on the tracks $T_{36}$ to $T_{53}$. Data of sync blocks SB128 to SB159 are recorded in the redundant HP areas on the tracks $T_{72}$ to $T_{89}$. As shown in FIG. 13B, an HP packet of the sync blocks SB0 to SB159 are recorded on the first 90 tracks. An HP packet of the sync blocks SB143 to SB302 is recorded on the next 90 tracks. An HP packet of the sync blocks S286 to SB445 is recorded on the further next 90 tracks.

As described above, the amount of data of one I frame is 1740 sync blocks/frame. 160 sync blocks are recorded on 90 tracks, which is the period of 1 GOP. In the next period of GOP, 17 sync blocks are redundantly recorded. Since 1740/(160−17)=12.17, a portion where data of one screen is divided by 12 is recorded every 90 tracks. Thus, data equivalent to one screen is recorded on 90×12=1080 tracks. On the last 90 tracks, the number of redundant sync blocks is less than 17 (10 in this embodiment). In addition, since GOP=9, each portion, where one screen data is divided by 12, is composed of one I frame, which is spaced apart from the adjacent portion by 9 frames.

FIG. 14 is a schematic diagram showing a screen where record data is reproduced at 17 times higher speed in the variable speed reproduction mode. As shown in FIG. 14, when the record data is reproduced in the variable speed reproduction mode, the screen is divided into 12 areas M1, M2, M3, ... and so forth. Each of the divided areas M1, M2, M3, ... and so forth is formed by reproducing data of an I frame of an HP packet for 160 sync blocks recorded in the redundant HP areas on 90 tracks. Thus, each of the divided areas M1, M2, M3, ... and so forth is formed of I frame data that is spaced apart from each other by 9 frames. When HP packet data equivalent to 160 sync blocks recorded on 90 tracks, which is the period of 1 GOP, are shifted every 90 tracks, all the divided areas M1, M2, M3, ... and so forth can be updated in the variable speed reproduction mode.

Figure 15:
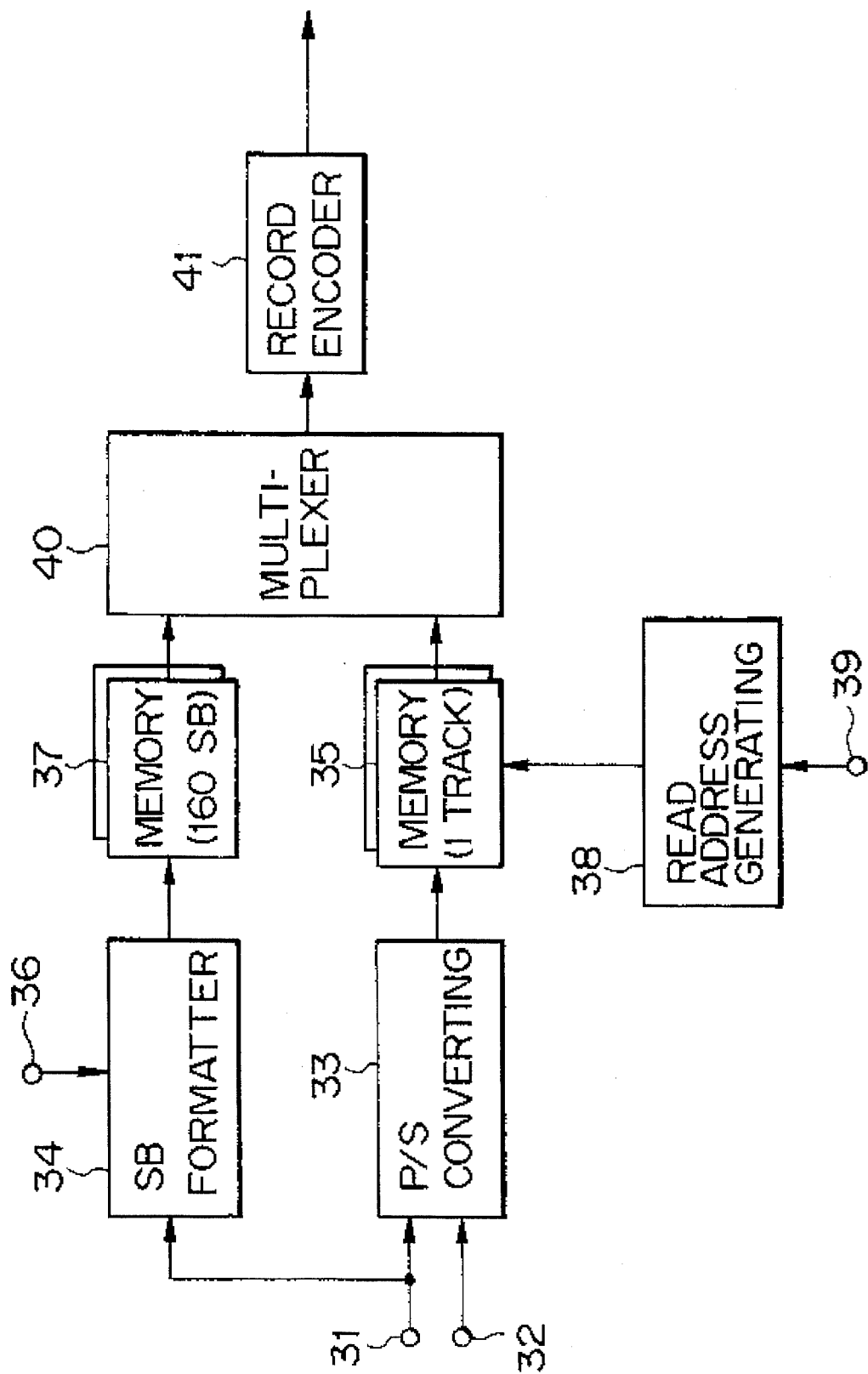
FIG. 15 is a block diagram showing a practical construction of a format converting portion according to the first embodiment of the present invention.

FIG. 15 is a block diagram showing a format converting portion. In the format converting portion, HP packet data for 160 sync blocks are recorded in redundant HP areas on 90 tracks with a redundancy of 18 tracks. HP packet data equivalent to 160 sync blocks recorded on the 90 tracks are shifted every 90 tracks. In FIG. 15, reference numeral 31 and 32 are input terminals. Data of an HP packet is supplied to the input terminal 31. Data of an SP packet is supplied to the input terminal 32. The data of the HP and SP packets are supplied to a parallel serial converting circuit 33. In addition, the data of the HP packet is supplied to a sync block formatter 34.

The parallel serial converting circuit 33 converts the HP packet data and the SP packet data into serial data. The output of the parallel serial converting circuit 33 is supplied to a memory 35. The memory 35 stores the HP packet data and the SP packet data for one track.

A timing signal is supplied from an input terminal 36 to the sync block formatter 34. The output of the sync block formatter 34 is supplied to a memory 37. The memory 37 stores HP packet data for 160 sync blocks recorded on 90 tracks.

Reference numeral 38 is a read address generator. The read address generator 38 receives an area control signal from an input terminal 39. The read address generator 38 generates a read address according to the area control signal. The read address is supplied to the memory 35. Thus, the positions of redundant HP areas are allocated.

Reference numeral 40 is a multiplexer. The multiplexer 40 places HP packet data stored in the memory 37 in the HP packet data and the SP packet data stored in the memory 35. The outputs of the memories 35 and 37 are supplied to the multiplexer 40. The output of the multiplexer 40 is supplied to an encoder 41.

Figure 16:
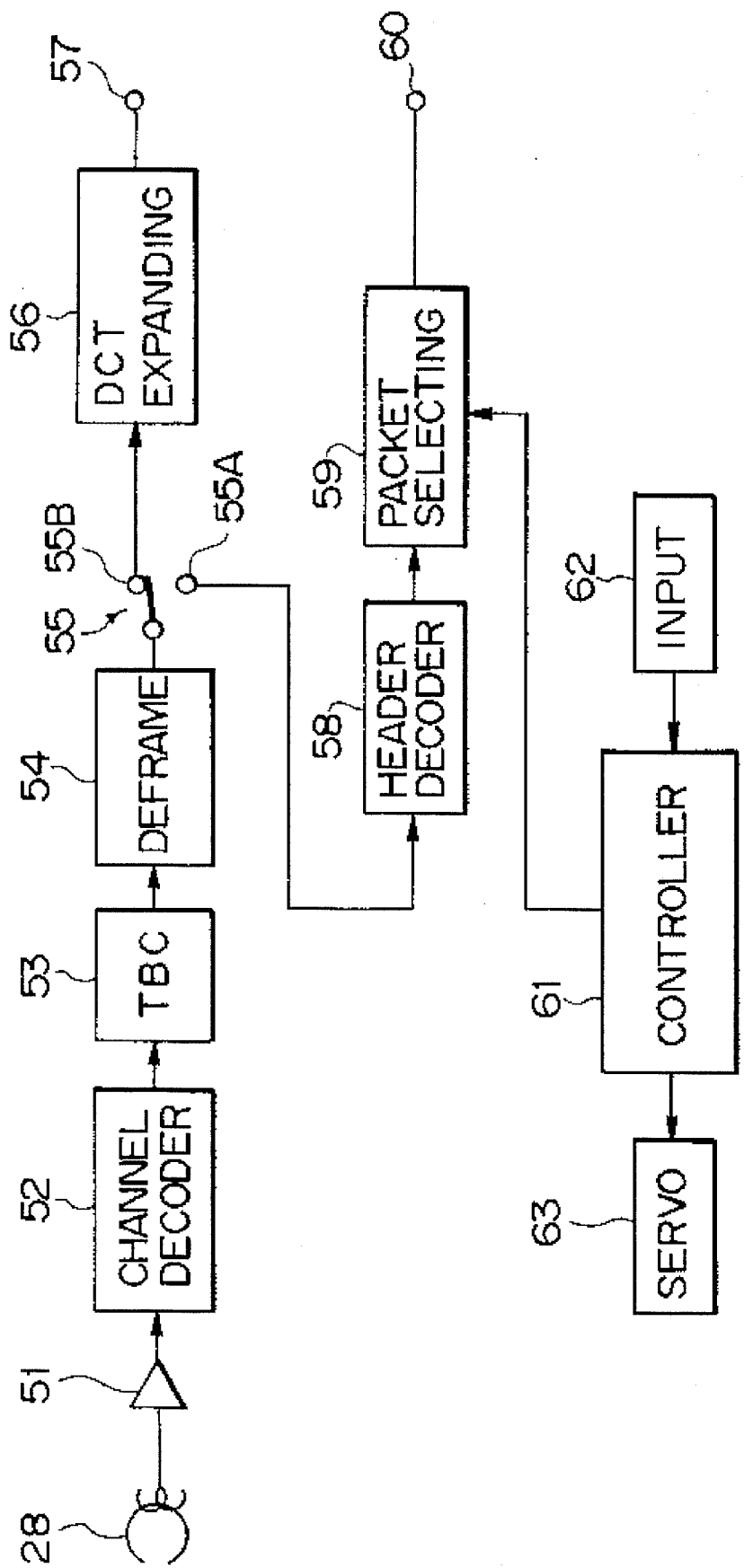
FIG. 16 is a block diagram showing a construction of a reproducing system of the digital VCR according to the first embodiment of the present invention.

FIG. 16 is a block diagram showing a construction of a reproducing system of the recording and reproducing portion 5 of the digital VCR 2. In FIG. 16, a record signal on the magnetic tape is reproduced by a rotating head 28. The reproduced signal is supplied to a channel decoder 52 through a reproducing amplifier 51. The channel decoder 52 demodulates the reproduced signal corresponding to the modulating system of the channel encoder 26 of the above-described recording system.

Reference numeral 53 is a TBC (Time Base Corrector). The TBC 53 removes a fluctuating component on time base from the reproduced signal. The TBC 53 receives a write clock and a read clock. The read clock corresponds to a reproduced signal, whereas the write clock corresponds to a reference signal. The output of the channel decoder 52 is supplied to the TBC 53.

Reference numeral 54 is a deframing circuit. The deframing circuit 54 corresponds to the frame segmenting circuit 25 of the recording system. The deframing circuit 54 performs an error correcting operation for the reproduced data. The output of the TBC circuit 53 is supplied to the deframing circuit 54.

Reference numeral 55 is a switch circuit. The switch circuit 55 selects an signal corresponding to the AD-HDTV system or a component video signal. The output of the TBC circuit 53 is supplied to the switch circuit 55. When the reproduced signal is the signal corresponding to the AD-HDTV system, the switch circuit 55 is connected to a terminal 55A. When the reproduced signal is the component video signal, the switch circuit 55 is connected to a terminal 55B.

Reference numeral 56 is a DCT expanding circuit. The DCT expanding circuit 56 corresponds to the DCT compressing circuit of the recording system. The DCT expanding circuit 56 decodes a variable length code and performs an inverse-DCT operation for the decoded code so as to expand a compressed video signal to the original base band video signal. The output of the terminal 55B of the switch circuit 55 is supplied to the DCT expanding circuit 56. The video signal is obtained from an output terminal 57.

Reference numeral 58 is a header decoder. Reference numeral 59 is a packet selecting circuit. The header decoder 58 decodes the header of the AD-HDTV reproduced signal and determines whether the reproduced signal is I frame data or not. The output of the terminal 55A of the switch circuit 55 is supplied to the header decoder 58. The output of the header decoder 58 is supplied to the packet selecting circuit 59. When the variable speed reproduction is performed, only I frame data is valid. The packet selecting circuit 59 selects a packet of I frame data and outputs it. The output of the packet selecting circuit 59 is supplied from an output terminal 60.

Reference numeral 61 is a controller. The controller 61 controls to select the normal reproduction or variable speed reproduction. A mode setting signal is supplied from an input portion 62 to the controller 61. The servo circuit 63 and the packet selecting circuit 59 are set corresponding to the mode setting signal. When the signal corresponding to the AD-HDTV system is reproduced in the variable speed reproduction mode, the servo circuit 63 controls the tape speed corresponding to phase information based on a tracking signal such as ATF so as to keep the relation of head trace positions and track positions equal. Thus, reproduction valid areas on tracks are fixed. As was described above, the reproduction valid areas are referred to as redundant HP areas $D_{HP}$. Thus, when the variable speed reproduction is performed, data of an HP packet containing I frame data is always reproduced.

FIGS. 17A, 17C, and 17E show reproduced RF signals where the variable speed reproduction is performed at 4 times higher speed, 9 times higher speed, and 17 times higher speed, respectively. FIGS. 17B, 17D, and 17F show reproduction valid areas on tracks where the variable speed reproduction is performed at 4 times higher speed, 9 times higher speed, and 17 times higher speed, respectively. In these drawings, EN1, EN2, and EN3 represent fixed reproduction valid areas in the variable speed reproduction at 4 times higher speed, 9 times higher speed, and 17 times higher speed, respectively. As shown in FIGS. 17B and 17F, EN1, which is the fixed reproduction valid area in the variable speed reproduction at 4 times higher speed, includes EN3, which is the fixed reproduction valid area in the variable speed reproduction at 17 times higher speed. In addition, as shown in FIGS. 17D and 17F, EN2, which is the fixed reproduction valid area at 9 times higher speed, includes EN3. Thus, when EN3 has a redundant HP area in which HP packet data is recorded, the HP packet data can be securely extracted even if the variable speed reproduction is performed at 4 times higher speed or 9 times higher speed. In other words, when the reproduction valid area for 17 times higher speed is allocated to a redundant HP area, the variable speed reproduction can be properly performed at any speeds lower than 17 times higher speed.

As described above, the AD-HDTV system is a full-digital type broadcasting system. In this system, MPEG2 encoding algorithm is used. In the AD-HDTV system, image data is encoded corresponding to the MPEG2 algorithm. Thereafter, the encoded bit stream is categorized as high priority data (HP data) and standard priority data (SP data). The HP data and the SP data are separately transmitted as HP data and SP data. When a header AH that represents information of each packet is added to the packet, variable speed reproduction can be properly performed by the digital VCR according to the first embodiment.

However, a signal may be transmitted from the broadcasting station corresponding to main profile and main level of the MPEG2 algorithm. In the main profile and main level of the MPEG2 algorithm, the separation of HP data and SP data is not defined. Thus, in such a system, video data is transmitted without being divided into an HP data packet and an SP data packet.

When a signal transmitted from the broadcasting station corresponds to the main profile and main level of the MPEG2 algorithm, it is supposed that most of home-use receivers (decoders) only decode the main profile and main level. In this case, a signal reproduced on the digital VCR should correspond to the main profile and main level of the MPEG2 algorithm both in the normal reproduction mode and the variable speed reproduction mode.

In this case, the digital VCR should divide a received signal into HP data and SP data before recording the signal. In addition, data used in high speed reproduction, namely HP data, should correspond to the main profile and main level of the MPEG2 algorithm.

Figure 18:
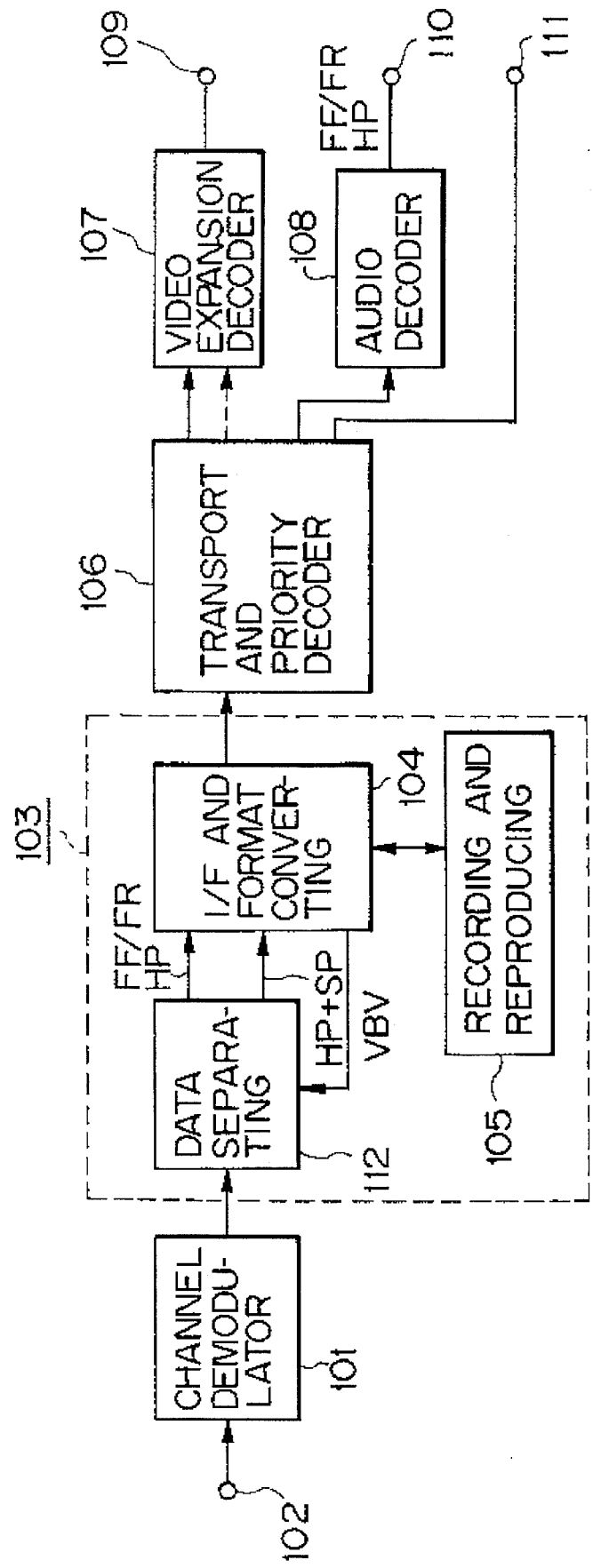
FIG. 18 is a block diagram for explaining a second embodiment of the present invention.

FIG. 18 is a block diagram showing a construction of a video recording and reproducing system according to a second embodiment of the present invention. In this embodiment, the video recording and reproducing system can divide a received signal into HP data and SP data. In this embodiment, an interface and format converting portion 104 is preceded by a data separator 112. In FIG. 18, the constructions of a channel demodulator 101, a transport and priority encoder 106, a video expanding decoder 107, and an audio encoder 108 are the same as the constructions of the channel demodulator 1, the transport and priority encoder 6, the video expanding decoder 7, and the audio encoder 8 according to the first embodiment. The difference between the second embodiment and the first embodiment is in that the data separator 112 precedes the interface and format converting portion 104. In addition, the construction of the interface and format converting portion 104 according to the second embodiment differs from the construction of the interface and format converting portion 4 according to the first embodiment.

Figure 19:
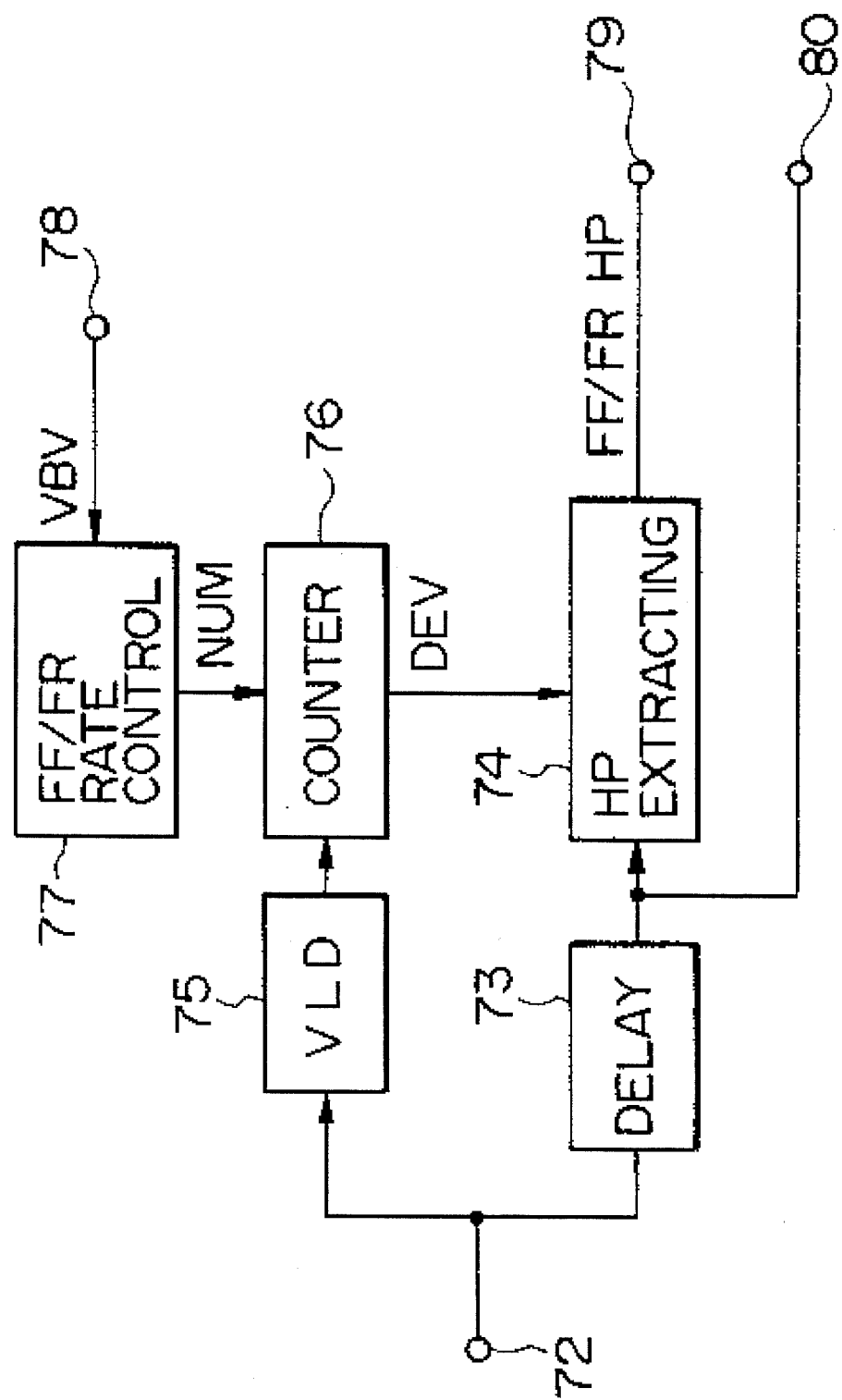
FIG. 19 is a block diagram showing a practical construction of a data separating circuit according to the second embodiment of the present invention.

Next, the construction of the data separator 112 will be described. FIG. 19 is a block diagram showing a construction of the data separator 112. In FIG. 19, a bit stream corresponding to the MPEG2 algorithm is supplied to an input terminal 72. The bit stream is supplied to an HP extractor 74 through a delaying circuit 73. In addition, the bit stream is supplied to a VLD circuit 75. The delaying circuit 73 delays the bit stream corresponding to process time of a decoding operation of the VLD circuit 75. The VLD circuit 75 decodes variable length code corresponding to the MPEG2 algorithm and analyzes the structure of the bit stream. The output of the VLD circuit 75 is supplied to a counter 76.

The counter 76 receives a value NUM from a FF/FR rate controlling circuit 77. An occupy flag VBV is supplied from a terminal 78 to the FF/FR rate controlling circuit 77. The counter 76 and the FF/FR rate controller 77 determine data to be allocated to HP data corresponding to the analyzed result of the structure of the bit stream. The counter 76 outputs a separated signal DEV. The separated signal DEV is supplied to an HP extractor 74.

The HP extractor 74 places an EOB (End Of Block) code at the end of data allocated to the HP data (normally, a particular DCT coefficient of each block). Thus, even if the bit stream is only HP data, it corresponds to the main profile and main level of the MPEG2 algorithm. Thus, decoders that only decode the main profile and main level of the MPEG2 algorithm can decode only HP data.

The HP extractor 74 is connected to an output terminal 79. The output terminal 79 outputs high speed reproduction HP data and conventional reproduction data (HP and SP data). As with the first embodiment, the high speed reproduction HP data is written to redundant HP areas. When the high speed reproduction is performed, the high speed reproduction HP data is read from the redundant HP areas. The delaying circuit 73 is connected to an output terminal 80.

The output terminal 80 outputs normal reproduction data (namely, bit stream corresponding to the main profile and main level of the MPEG2 algorithm).

Next, the allocation of HP data will be described. First, variable length code encoding corresponding to the MPEG2 algorithm will be descried. For example, a DCT coefficient is variable-length encoded with a set of one non-zero coefficient and a level (run, level). Thus, in the case of a DCT coefficient, a set of (run, level) is a VLC event.

The FF/FR rate controller 77 provides data amount that is allocable to HP data. The data amount is a multiple of slices. The FF/FR rate controller 77 determines a number NUM of non-zero DCT coefficients allocated to HP data and supplies the number NUM to the counter 76.

The counter 76 adds the number of non-zero DCT coefficients in zigzag scanning sequence corresponding to the number of VLC events. When the counter 76 counts the number NUM, it outputs a separation signal DEV to the HP extractor 74. When an EOB is detected before the counter 76 counts the number NUM, the counter 76 is reset and the data of the preceding block is allocated to the HP data.

The number NUM is set by the FF/FR rate controlling unit 77, slice by slice. When the redundant area is becoming an overflow with HP data, the FF/FR rate controlling unit 77 decreases the data amount allocated to the HP data corresponding to the redundant HP area occupy flag VBV. In other words, the FF/FR rate controlling unit 77 decreases the number NUM. When the amount of HP data stored in the redundant area is small, the FF/FR rate controlling unit 77 increases the data amount allocated to the HP data.

Next, the construction of the interface and format converting portion 104 according to the second embodiment will be described with reference to FIG. 20. The interface and format converting portion 4 shown in FIG. 20 corresponds to the interface and format converting portion 4 according to the first embodiment (shown in FIG. 15). In other words, the interface and format converting portion 104 writes high speed reproduction HP data to redundant HP areas. A high speed reproduction HP packet is supplied from an input terminal 131. The high speed reproduction HP data is supplied to a sync block formatter 134. Normal reproduction data is supplied from an input terminal 132. The normal reproduction data is supplied to a parallel serial converting portion 133.

As with the first embodiment, the sync block formatter 134 writes the high speed reproduction data to predetermined sync blocks so as to format sync blocks. In addition, the sync block formatter 134 outputs a flag VBV that represents whether or not a predetermined sync block is occupied. The flag VBV is supplied to a data separator 112.

Figure 20:
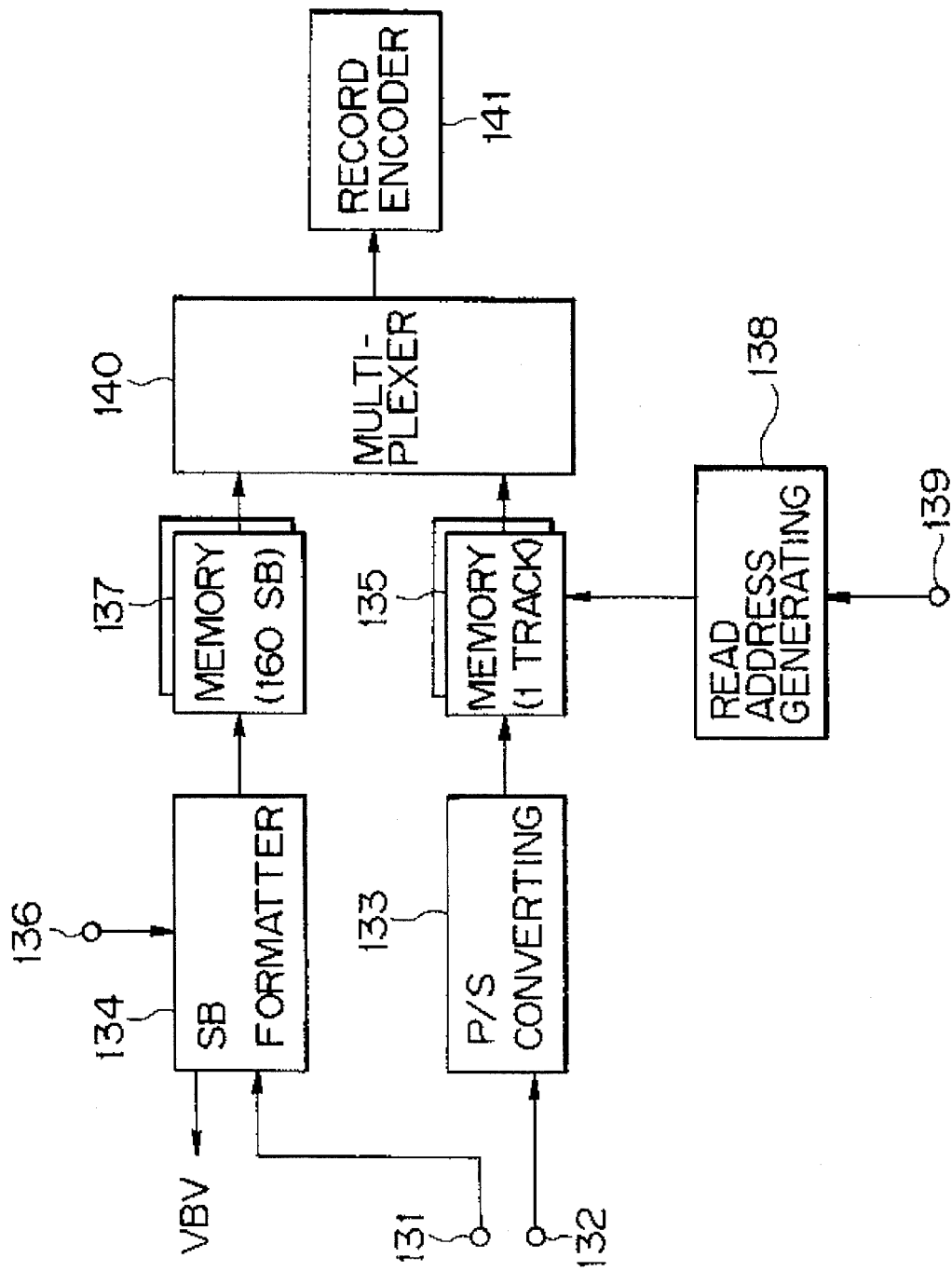
FIG. 20 is a block diagram showing a practical construction of a format converting portion according to the second embodiment of the present invention.

In FIG. 20, the constructions of a memory 135, a memory 137, a read address generating circuit 138, a multiplexer 140, and a recording encoder 141 are the same as the constructions of the memory 35, the memory 37, the read address generating circuit 38, the multiplexer 40, and the recording encoder 41 shown in FIG. 15.

When the interface and format converting portion 4 according to the first embodiment is modified as described above, data that was recorded on a digital VCR corresponding to the main profile and main level of the MPEG2 algorithm can be properly reproduced in the variable speed reproduction mode.

Figure 21:
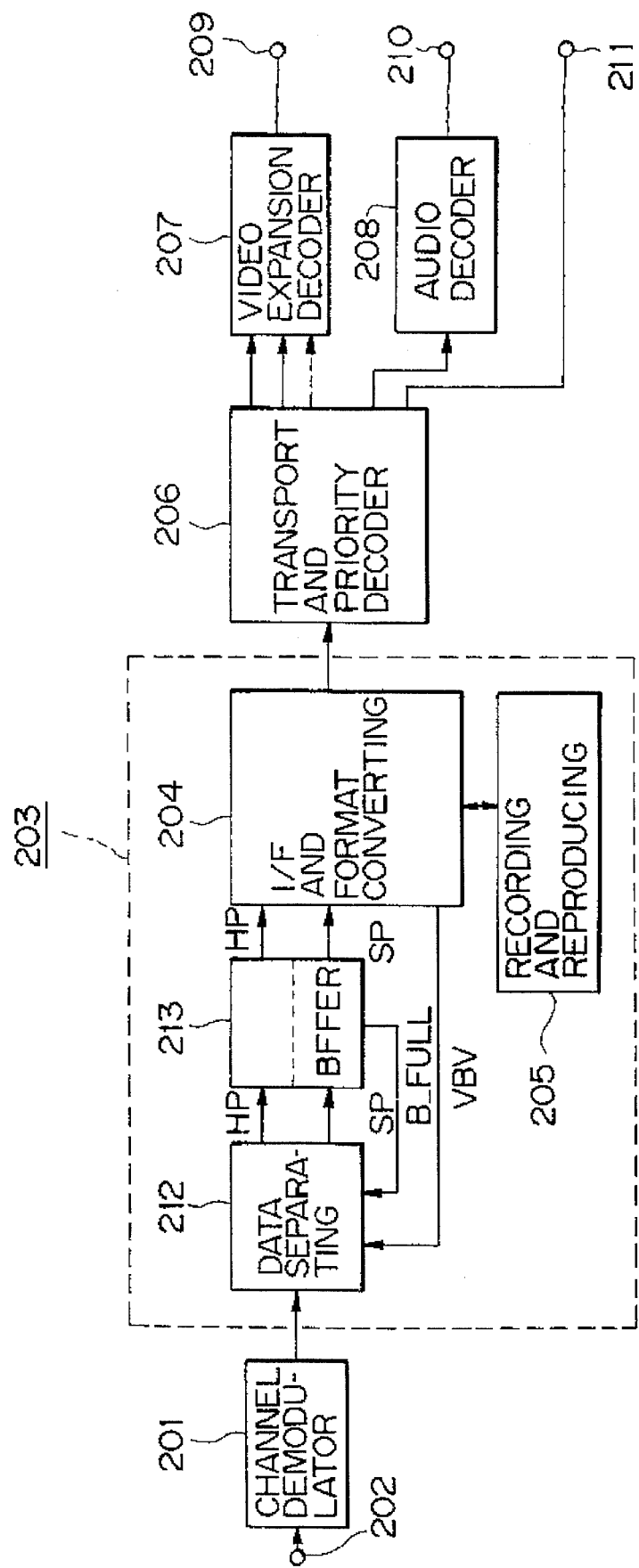
FIG. 21 is a block diagram for explaining a third embodiment of the present invention.

FIG. 21 is a block diagram showing a third embodiment of the present invention. The third embodiment is applied to a digital VCR with a receiver (decoder) that decodes a bit stream corresponding to the MPEG2 algorithm that was not divided into HP data and SP data on the broadcasting side.

In FIG. 21, the constructions of a channel demodulator 201, a transport and priority encoder 206, a video expanding decoder 207, and an audio encoder 208 are the same as the constructions of the channel demodulator 1, the transport and priority encoder 6, the video expanding decoder 7, and the audio encoder 8 according to the first embodiment. The construction of the video recording and reproducing system according to the third embodiment is the same as the construction according to the first embodiment except for a data separator 212, an interface and format converting portion 204, and a two-point buffer 213.

Figure 22:
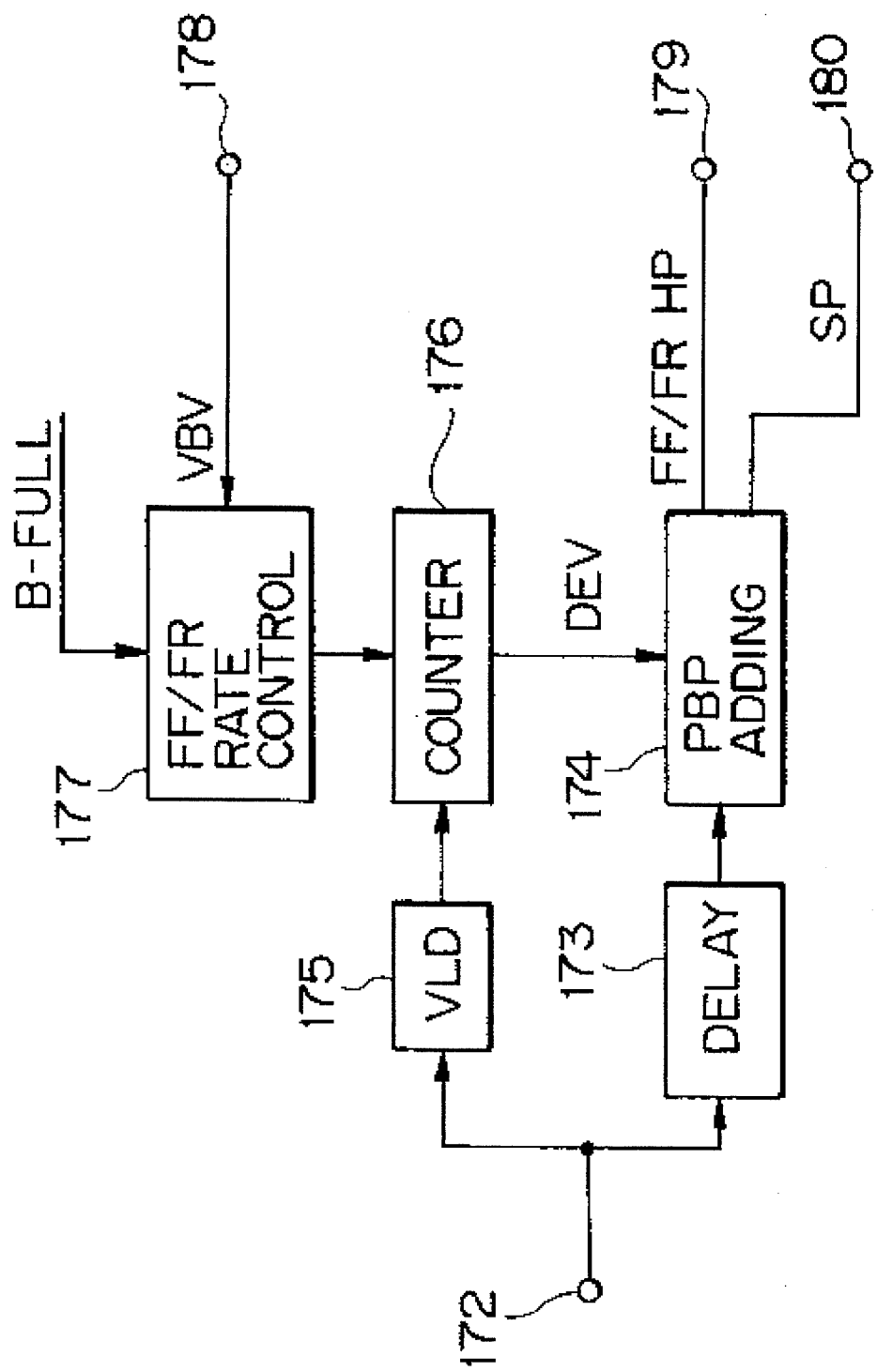
FIG. 22 is a block diagram showing a practical construction of a data separating circuit according to the third embodiment of the present invention.

FIG. 22 is a block diagram showing a construction of the data separator 212 according to the third embodiment. In FIG. 22, a bit stream corresponding to the MPEG2 algorithm is supplied to an input terminal 172. When this bit stream is supplied to the input terminal 172, the delaying circuit 173 delays the bit stream for the process time of the VLD circuit 175. The delayed bit stream is supplied to a PBP adding unit 174. The VLD circuit 175 decodes the variable length code corresponding to the MPEG2 algorithm and analyzes the structure of the bit stream. A counter 176 and an FF/FR rate controlling unit 177 determine data to be allocated to HP data corresponding to the analyzed result.

A PBP (Priority Break Point) adding unit 174 writes information of data allocated to the HP data to a header of the bit stream corresponding to the MPEG2 algorithm and separately outputs the data allocated to the HP data as high speed reproduction HP data and SP data. All headers are included in both the HP data and SP data. FIG. 23 shows a construction of the header.

The data separator 212 outputs the above-described high speed reproduction HP data and normal reproduction data (SP data). As with the first embodiment, the high speed reproduction HP data is written to redundant HP areas. When the high speed reproduction is performed, the high speed reproduction HP data is read from the redundant HP areas.

Next, the allocation of the HP data will be described. The FF/FR rate controlling unit 177 determines the data amount to be allocated to HP data, slice by slice. In addition, the FF/FR rate controlling unit 177 outputs a flag PBP that represents a separation point to the counter 176. FIG. 23 shows values of PBP. For example, when PBP=2, up to second non-zero coefficient in zigzag scanning sequence except for DCFLCA is allocated to HP data.

When the PBP adding unit 174 receives DEV from the counter 176, data that was input to the PBP adding unit 174 so far is output as HP data. In other words, all data of the block is allocated to HP data.

The FF/FR rate controller 177 sets PBP, slice by slice. When the redundant areas are becoming an overflow with HP data, the FF/FR rate controller 177 decreases the data amount to be allocated to the HP data corresponding to a redundant HP area occupy flag VBV and a buffer occupy flag B_FULL, thereby decreasing the value of PBP. The redundant HP area occupy flag VBV is received from the interface and format converting portion 204 through the terminal 178. The buffer occupy flag B_FULL is received terminal 178. The buffer occupy flag B_FULL is received from a two-point buffer that has the same capacity as the code buffer 213 of the decoder. When the data amount is smaller than the capacity of the redundant HP areas, the FF/FR rate controller 177 increases the data amount to be allocated to the HP data, thereby increasing the value of PBP.

Next, the buffer control will be described. When a bit stream is decoded, the encoder has a virtual buffer with the same capacity as the code buffer of the decoder has so as to prevent the code buffer from overflowing or underflowing. The bit stream is supplied to the virtual buffer. By monitoring the occupying amount of the virtual buffer, the bit allocation is controlled. A picture header records VBV-delay that represents a read timing at which the decoder reads bit data from the code buffer.

The division of HP data and SP data should involve buffer control. When HP data and SP data are separately input, the decoder should have two code buffers for the HP data and SP data. In other words, two VBV_delay flags should be recorded. Even if the buffers do not overflow with HP data and SP data, the buffers for the HP data and SP data may overflow or underflow.

When a bit stream is divided into HP data and SP data, a two-point buffer 213 records one vbv_delay so as to compensate buffer management. In the MPEG2 algorithm, the capacity of the virtual buffer is defined to be 1.75 Mbits. Thus, the capacity of the two-point buffer 213 is 1.75 Mbits.

In the AD-HDTV system, the data ratio between HP data and SP data is 1 to 4. When a bit sequence is divided into HP data and SP data with such a data ratio, the two-point buffer 213 is partitioned with this ratio into two portions. In one portion, the HP data is stored. In the other portion, the SP data is stored. Each portion has a pointer that represents a buffer occupying amount. When both the decoder and the encoder have such buffers, only the buffer occupying amounts for HP data and SP data are monitored.

The two-point buffer 213 outputs the buffer occupying amount B_FULL for the HP data and SP data to the data separator 212. The data separator 212 performs the buffer management corresponding to B_FULL.

Figure 24:
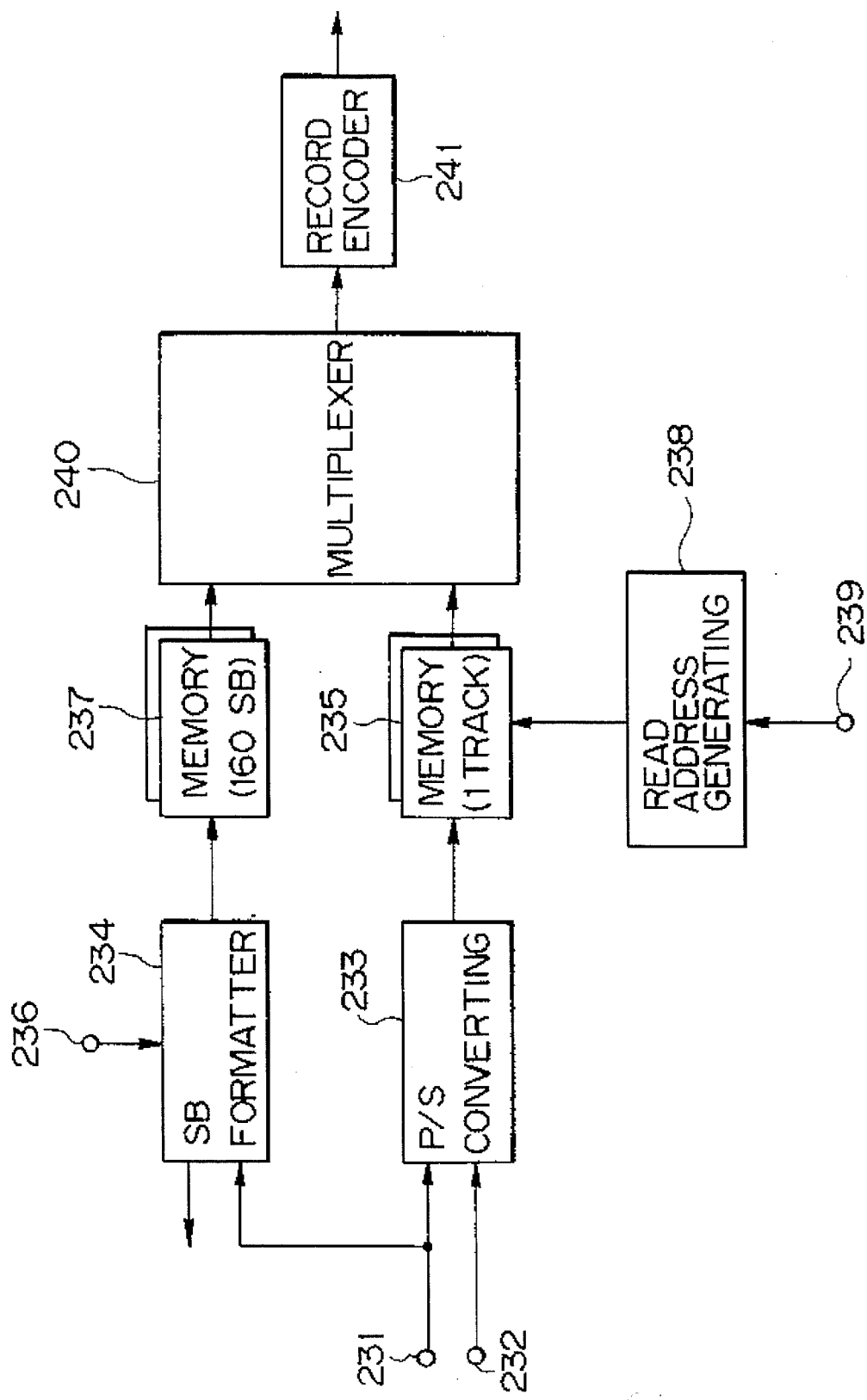
FIG. 24 is a block diagram showing a practical construction of a format converting portion according to the third embodiment of the present invention.

Next, with reference to FIG. 24, an interface and format converting portion will be described. The interface and format converting portion (shown in FIG. 24) corresponds to the interface and format converting portion according to first embodiment (shown in FIG. 15). High speed reproduction HP data is written to HP redundant areas. The high speed reproduction HP data is received from an input terminal 231. HP data is supplied to a sync block formatter 234 and a parallel serial converting circuit 233. Conventional reproduction data is received from an input terminal 232. The conventional reproduction data is supplied to the parallel serial converting circuit 233.

The sync block formatter 234 writes high speed reproduction data to predetermined sync blocks so as to format sync blocks as with the first embodiment. The sync block formatter 234 outputs a flag VBV that represents the occupying state of sync blocks. The flag VBV is supplied to a data separator 212.

The constructions of a memory 235, a memory 237, a read address generating circuit 238, a multiplexer 240, and a recording encoder 241 are the same as the constructions of the memory 35, the memory 37, the read address generating circuit 38, the multiplexer 40, and the record encoder 41 shown in FIG. 15.

When the first embodiment is modified as described above, even if a signal which was not divided into HP data and SP data is broadcast, with a receiver (decoder) that can decode a bit stream according to the MPEG2 algorithm, the signal recorded by a digital VCR can be properly reproduced in the variable speed reproduction mode.

Figure 25:
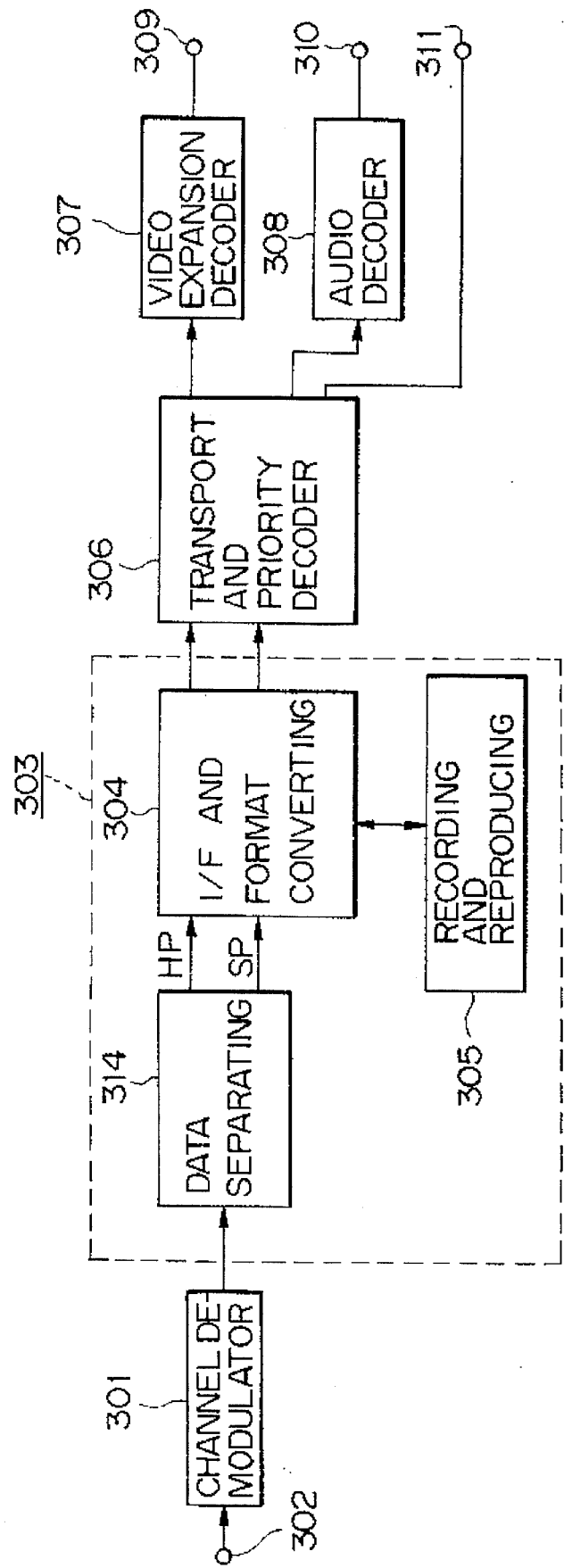
FIG. 25 is a block diagram for explaining a fourth embodiment of the present invention.

FIG. 25 is a block diagram showing a video recording and reproducing system according to a fourth embodiment of the present invention. In this embodiment, PBP, which is the same as that in the third embodiment, is written to a slice header on the broadcasting station side. However, a signal that was not divided into HP data and SP data is broadcast from the broadcasting station. The construction of the video recording and reproducing system according to the fourth embodiment is the same as the construction of the first embodiment (shown in FIG. 6) except for a data separating circuit 314.

Figure 26:
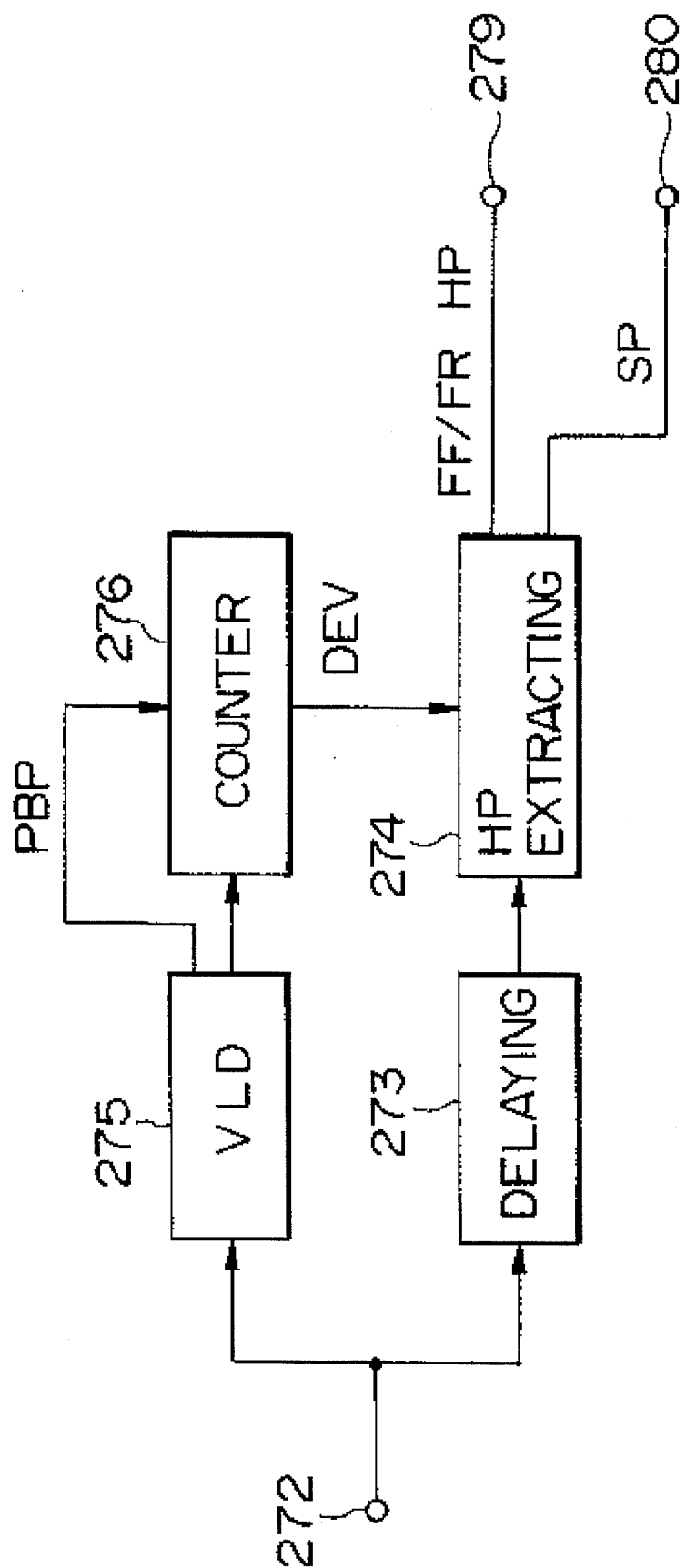
FIG. 26 is a block diagram showing a practical construction of a data separating circuit according to the fourth embodiment of the present invention.

FIG. 26 is a block diagram showing a construction of the data separating circuit 314 according to the fourth embodiment. In the fourth embodiment, a bit stream that is input to the VCR is not divided into HP data and SP data. However, as with the third embodiment, a PBP flag is recorded at a slice header. Thus, in this construction, it is not necessary to perform a rate control for dividing the input bit steam into HP data and SP data on the VCR side.

In FIG. 26, when a bit stream according to the MPEG2 algorithm is received from an input terminal 272, the bit stream is supplied to a VLD circuit 275. A delaying circuit 273 delays the input bit stream for the process time of the VLD circuit 275 and outputs the delayed bit stream to an HP extracting unit 274. The VLD circuit 275 decodes variable length code according to the MPEG2 algorithm so as to analyze the structure of the bit stream. The VLD circuit 275 decodes a slice header to PBP and outputs the PBP to a counter 276. The counter 276 determines data to be allocated to HP data corresponding to the analyzed result of the structure of the bit stream.

The counter 276 counts the number of non-zero DCT coefficients in zigzag scanning sequence. When the counter 276 counts the value equivalent to PBP, it supplies a separation signal DEV to the HP extracting unit 274. When EOB is detected before the counter 276 counts the value equivalent to PBP, the counter 274 is reset and all data of the block is allocated to HP data.

When the HP extracting unit 274 receives DEV, it outputs data that was input thereto so far as HP data. Thus, coefficient data with the data amount represented by PBP is output as the HP data.

The data separator 303 outputs the above-described high speed reproduction HP data and other data (SP data). The high speed reproduction HP data is written to redundant HP areas and read therefrom when a high speed reproduction is performed as with the first embodiment.

When the third embodiment is modified as described above, if a signal that was not divided into HP data and SP data and contains PBP is broadcast from the broadcasting station, with a receiver (decoder) that can decode a bit stream that is divided corresponding to MPEG2, the signal recorded by the digital VCR can be properly reproduced in the variable speed reproduction mode.

When a bit stream is divided into HP data and SP data, packet data may not contain a header AH of a signal corresponding to the AD-HDTV system. The HP data and SP data corresponding to the AD-HDTV system can be used for countermeasures against errors on the broadcasting station side. In other words, a header AH in the system layer may be used for countermeasures against errors. Next, an error recovery operation in a minimum packet loss for a signal that was divided into HP data and SP data and does not contain the header AH will be described. In other words, data is divided only in the video layer. Next, the method for recording a video signal that is broadcast in such a system to a digital VCR will be described.

As described in the third embodiment, the syntax of data division in the video layer according to the MPEG2 algorithm is a PBP flag that is recorded at a slice header. Since the slice header is HP data, SP data does not have information that represents a frame, a slice, and a macro-block to which a particular DCT coefficient relates. Thus, when an SP packet is lost, the synchronization between HP data and SP data is also lost.

To prevent such a problem, header information is placed in SP data along with HP data. With the header information of SP data, even if a packet is lost, the synchronization can be re-established. Thus, all header information is placed in SP data. This method can be accomplished by the construction of the first embodiment.

When a bit stream that was divided into HP data and SP data and does not contain a header AH is received, with a receiver (decoder) that can decode a bit stream corresponding to the MPEG2 algorithm, the bit stream that was recorded by the digital VCR can be properly reproduced in the variable speed reproduction mode.

Figure 27:
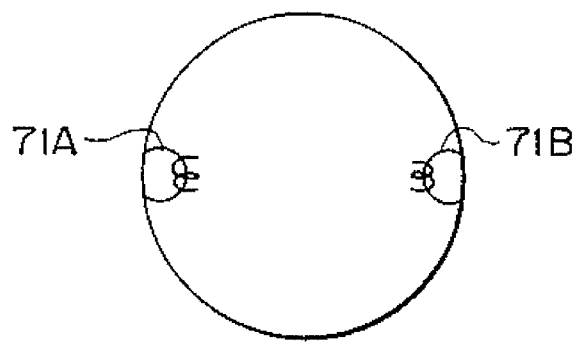
FIG. 27 is a plan view showing a head construction according to a fifth embodiment of the present invention.
Figure 28:
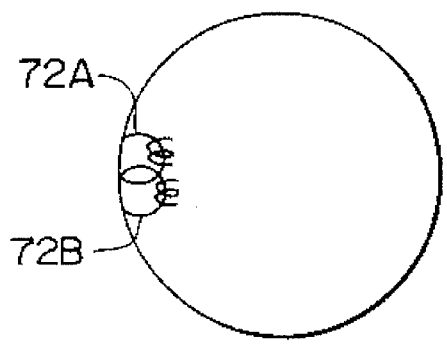
FIG. 28 is a plan view showing another head construction according to the fifth embodiment of the present invention.
Figure 29:
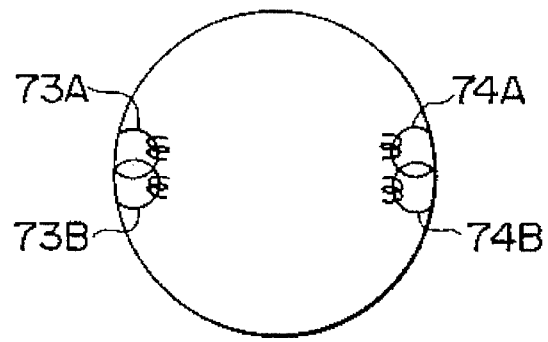
FIG. 29 is a plan view showing a further head construction according to the fifth embodiment of the present invention.

FIG. 27 shows a head construction of a digital VCR. In FIG. 27, two heads 71A and 71B with different azimuth angles are disposed in an opposite relation at an interval of 180°. FIG. 28 shows another head construction where double azimuth heads 72A and 72B are adjacently disposed. FIG. 29 shows a further head construction where a pair of double azimuth heads 73A and 73B and another pair of double azimuth heads 74A and 74B are disposed in an opposite relation at an interval of 180°. In the head constructions shown in FIGS. 27 and 28, the drum is rotated at 9000 rpm. On the other hand, in the four-head construction shown in FIG. 29, the drum is rotated at 4500 rpm.

Figure 30:
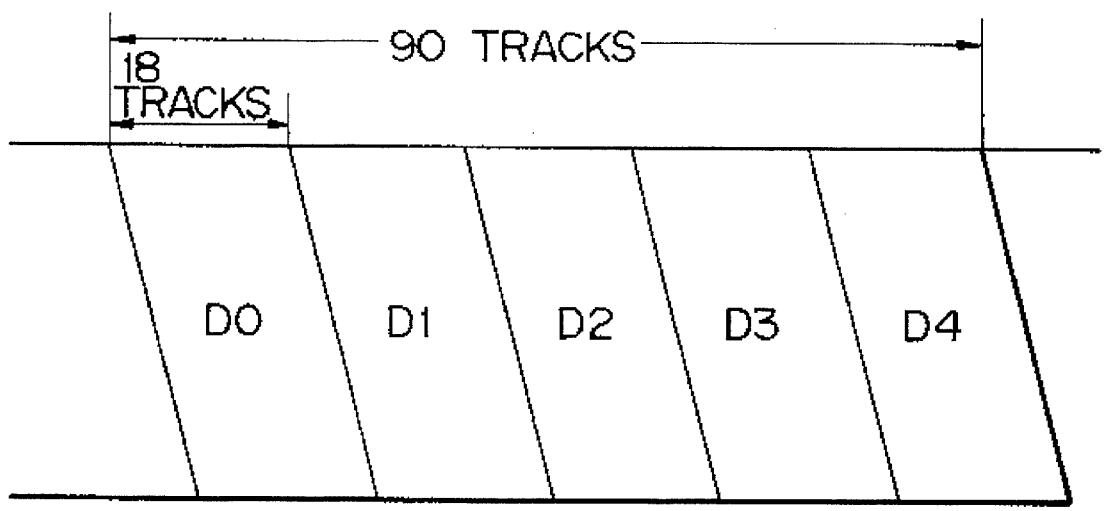
FIG. 30 is a schematic diagram for explaining the fifth embodiment of the present invention.

Assume that the same HP packet data is recorded on 18 tracks in succession, as shown in FIG. 30. In the drawing, HP packet data recorded on the first 18 tracks is designated D0, HP packet data recorded on the second 18 tracks is designated D1, HP packet data recorded on the third 18 tracks is designated D2, HP packet data recorded on the fourth 18 tracks is designated D3, and HP packet data recorded on the fifth 18 tracks is designated D4.

Figure 32:
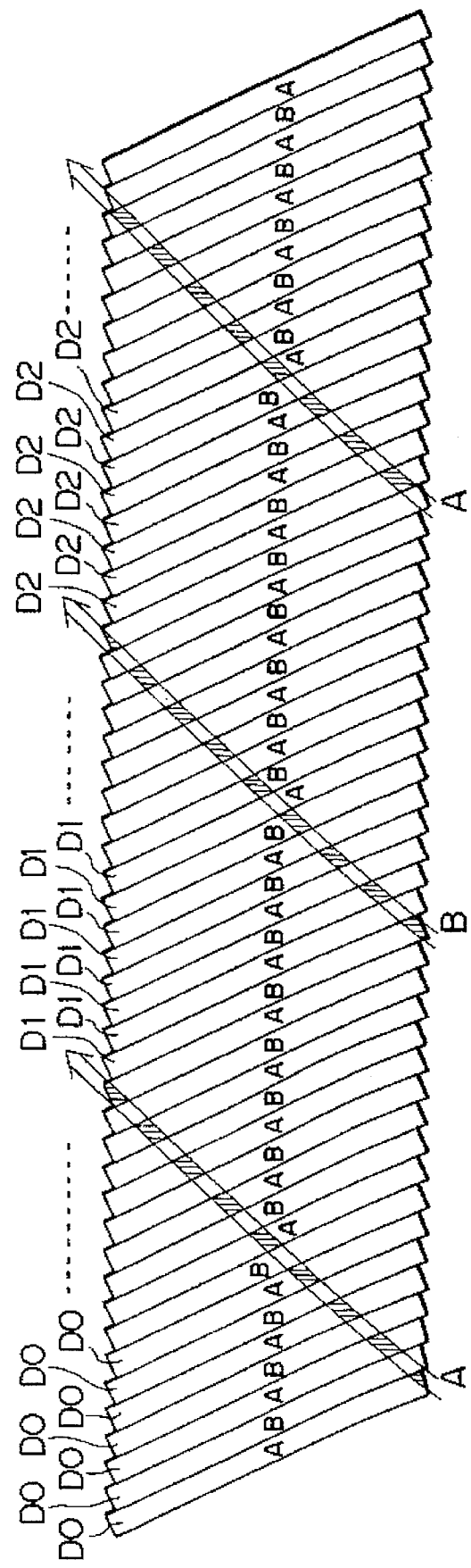
FIG. 32 is a schematic diagram for explaining the fifth embodiment of the present invention.

FIG. 32 shows paths of the heads 71A and 71B on tracks at 17 times higher speed in the variable speed reproduction mode. The heads 71A and 71B are disposed in an opposed relation at an interval of 180°. The same HP packet data is recorded on successive 18 tracks. In this construction, the head 71A on channel A reproduces packet data D0, whereas the head 71B on channel B reproduces packet data D1. Thus, the heads 71A and 71B reproduce all redundant packet data.

Figure 33:
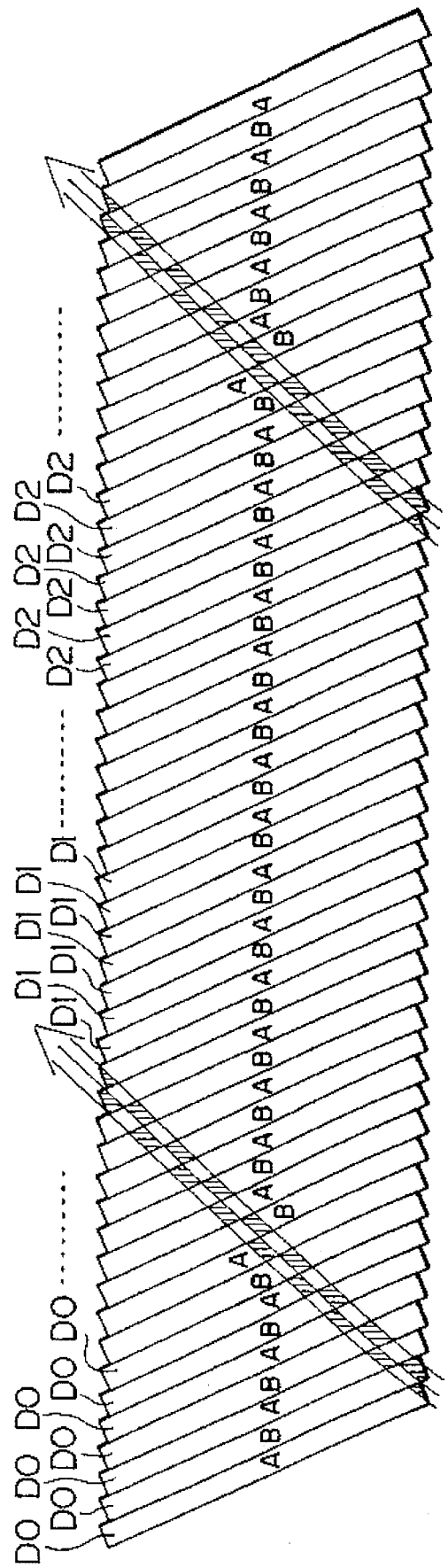
FIG. 33 is a schematic diagram for explaining the fifth embodiment of the present invention.

FIG. 33 shows paths of the double azimuth head 72A and 72B on tracks at 17 times higher speed in the variable speed reproduction mode. The same HP packet data is recorded on successive 18 tracks. In this construction, the head 72A on channel A and the head 72B on channel B reproduce HP packet data D0. However, the heads 72A and 72B cannot reproduce HP packet data D2. Thus, when the double azimuth heads 72A and 72B are used, they cannot reproduce all redundant HP packet data.

Figure 31:
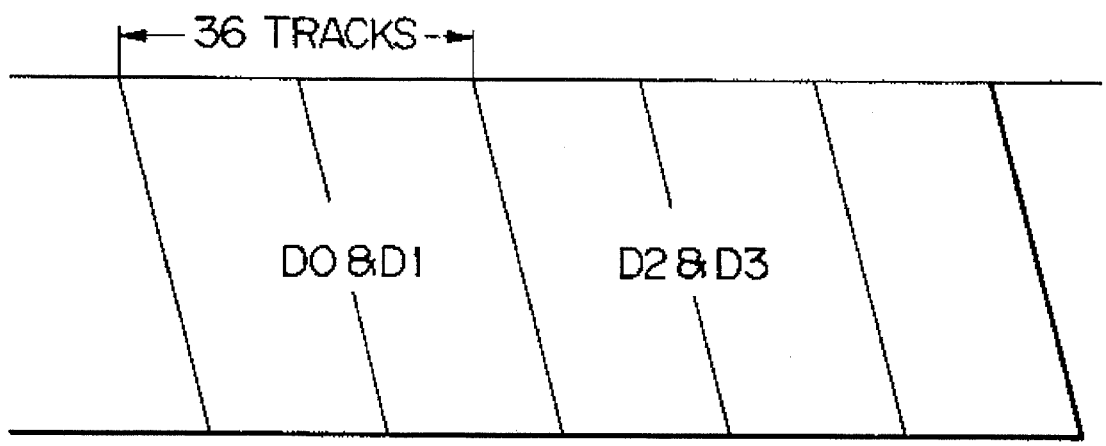
FIG. 31 is a schematic diagram for explaining the fifth embodiment of the present invention.

To solve this problem, as shown in FIG. 31, two HP packet data are recorded so that the same packet data is stored on the tracks with the same azimuth angle every 36 tracks.

Figure 34:
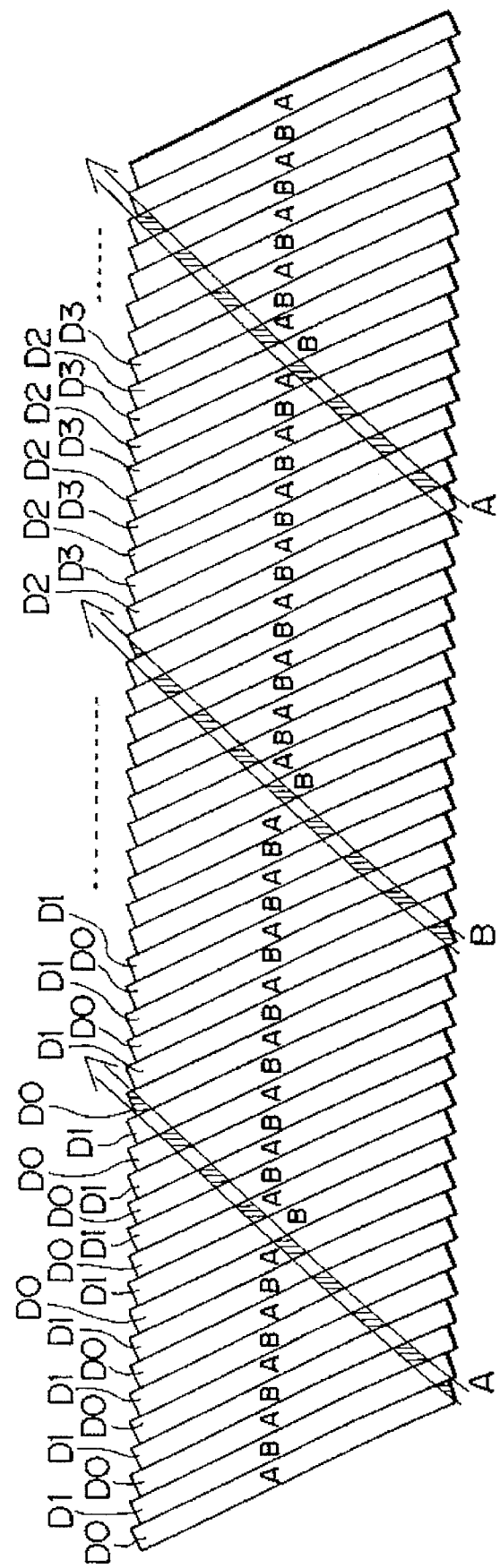
FIG. 34 is a schematic diagram for explaining the fifth embodiment of the present invention.

FIG. 34 shows paths of the heads 71A and 71B on tracks at 17 times higher speed in the variable speed reproduction mode. In this construction, the same HP packet data is recorded on the tracks with the same azimuth angle every 36 tracks. The head 71A on channel A reproduces HP packet data D0. The head 71b on channel B reproduces HP packet data D1. Thus, the heads 71A and 71B reproduce all the redundant HP packet data.

Figure 35:
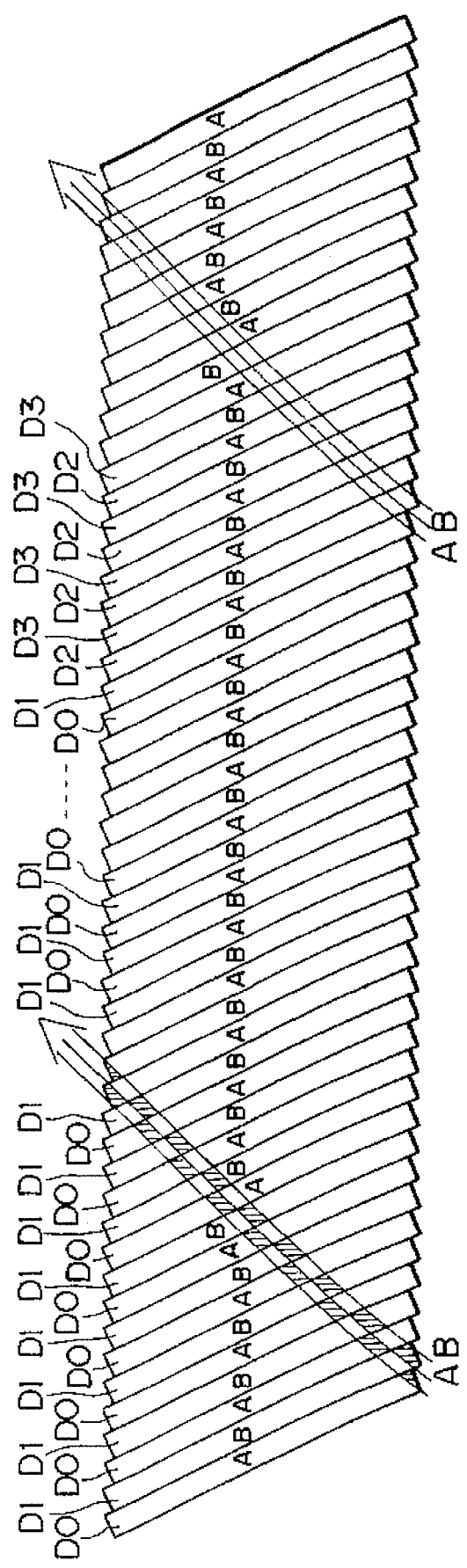
FIG. 35 is a schematic diagram for explaining the fifth embodiment of the present invention.

FIG. 35 shows paths of the double azimuth heads 72A and 72B on tracks at 17 times higher speed in the variable speed reproduction mode. In this construction, the same HP packet data is recorded on the tracks with the same azimuth angle every 36 tracks. In this construction, the head 72A on A channel reproduces HP packet data D0, whereas the head 72B on B channel reproduces HP packet data D1. Thus, the heads 72A and 72B reproduce all the redundant HP packet data.

Thus, when the same HP packet data is recorded on the tracks with the same azimuth angle every 36 tracks, with the heads 71A and 71B, which are disposed in the opposite relation at an interval of 180°, or with the double azimuth heads 72A and 72B, all HP packet data can be reproduced at 17 times higher speed in the variable speed reproduction mode.

Figure 36:
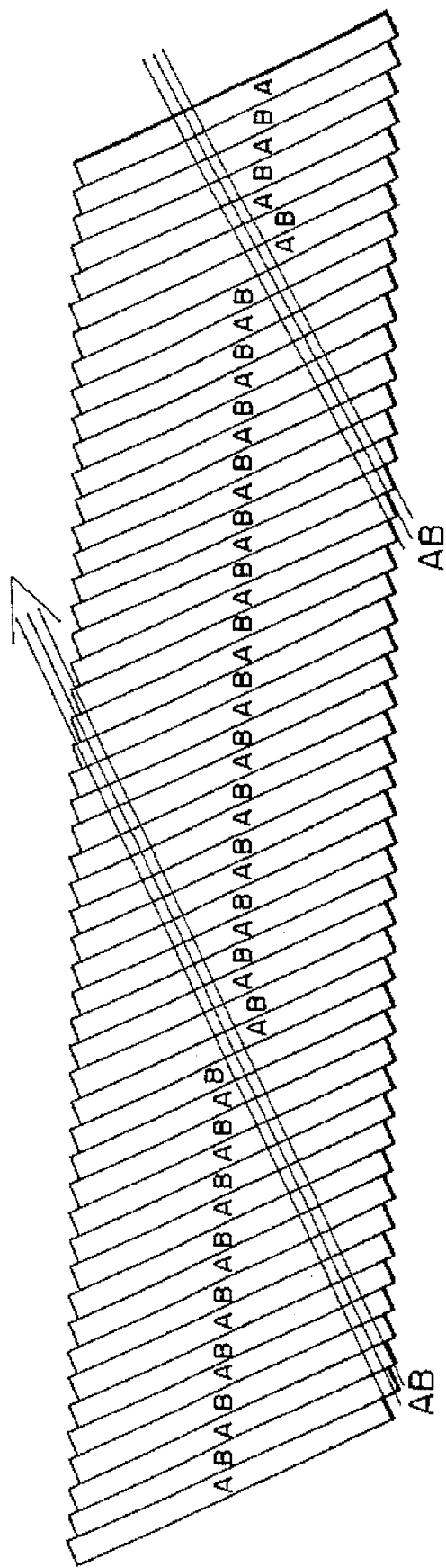
FIG. 36 is a schematic diagram for explaining the fifth embodiment of the present invention.

When four heads are used, since the rotations thereof are halved, the paths of the heads at the 17 times higher speed in the variable speed reproduction mode is shown in FIG. 36. The paths of the four heads at 9 times higher speed in the variable speed reproduction mode are the same as the paths of the double azimuth heads. Thus, when the same HP packet data is recorded on the tracks with the same azimuth angle every 36 tracks, the data can be reproduced at 9 times higher speed and 5 times higher speed in the variable speed reproduction mode.

FIG. 14 shows a screen where data recorded in such a way is reproduced at 17 times higher speed in the variable speed reproduction mode. As shown in FIG. 14, when the variable speed reproduction is performed, the screen is divided into 12 areas M1, M2, M3, . . . and so forth. Each of the areas M1, M2, M3, . . . and so forth is formed by reproducing data of I frame of an HP packet for 160 sync blocks recorded in redundant HP areas for 90 tracks. Thus, when the variable speed reproduction is performed, all the areas M1, M2, M3, . . . and so forth can be updated.

FIG. 37 is a schematic diagram showing read/write timings of the memories 17A to 17C. FIG. 37A shows the period of GOP. As shown in FIGS. 37B to 37D, data are successively stored in the memories 37A to 37C. As shown in FIGS. 37D to 37G, data are successively read from the memories 37A to 37C on two channels.

What is claimed is:

1. A digital video signal recording apparatus for directly recording a compressed transmission image signal on a magnetic tape, the image signal being divided into an in-frame encoded frame and a forward or bi-directional predict encoded frame that are categorized as a high priority packet and a standard priority packet, data of the in-frame encoded frame being contained in the high priority packet, comprising:

surplus record area forming means for causing the transmission rate of the high priority data to be lower than the transmission rate of the conventional compressed digital video signal so as to form a surplus record area; and recording means for redundantly recording the high priority data in the surplus area formed by said surplus record area forming means.

2. The digital video signal recording apparatus as set forth in claim 1, wherein the surplus record area is formed in a reproduction valid area that is fixed in a variable speed reproduction.

3. A digital video signal recording apparatus for directly recording a compressed transmission image signal on a magnetic tape, the image signal being divided into an in-frame encoded frame and a forward or bi-directional predict encoded frame that are categorized as a high priority packet and a standard priority packet, data of the in-frame encoded frame being contained in the high priority packet, comprising:

surplus record area forming means for causing the transmission rate of the high priority data to be lower than the transmission rate of the conventional compressed digital video signal so as to form a surplus record area; and recording means for redundantly recording the high priority data in the surplus area formed by said surplus record area forming means wherein the high priority packet data is redundantly recorded in the surplus record area for successive n tracks when the variable speed reproduction is performed at n times higher speed.

4. A digital video signal recording Apparatus for directly recording a compressed transmission image signal on a magnetic tape, the image signal being divided into an in-frame encoded frame and a forward or bi-directional predict encoded frame that are categorized as a high priority packet and a standard priority packet, data of the in-frame encoded frame being contained in the high priority packet, comprising:

surplus record area forming means for causing the transmission rate of the high priority data to be lower than the transmission rate of the conventional compressed digital video signal so as to form a surplus record area; and recording means for redundantly recording the high priority data in the surplus area formed by said surplus record area forming means wherein the position of the high priority packet data recorded in the surplus record area is shifted whenever the in-frame encoded frame is received.

5. A digital video signal recording apparatus for directly recording a compressed transmission image signal on a magnetic tape, comprising:

dividing means for dividing the image signal into high priority data and standard priority data;

a surplus record area forming means for causing the transmission rate of the high priority data to be lower than the transmission rate of the conventional compressed digital video signal so as to form a surplus record area; and recording means for recording the high priority data in the surplus area formed by said surplus record area forming means.

6. A digital video signal reproducing apparatus for reproducing a digital video signal from a magnetic tape, high priority packet data and standard priority packet data being recorded on the magnetic tape, each track of the magnetic tape having a surplus record area, the high priority packet data being recorded in the surplus record area, comprising:

reproducing means for reproducing the high priority packet data recorded in the surplus record area in a variable speed reproduction.

7. A digital video signal recording method for directly recording a compressed transmission image signal on a magnetic tape, the image signal being divided into an in-frame encoded frame and a forward or bi-directional predict encoded frame that are categorized as a high priority packet and a standard priority packet, data of the in-frame encoded frame being contained in the high priority packet, comprising the steps of:

causing the transmission rate of the high priority data to be lower than the transmission rate of the conventional compressed digital video signal so as to form a surplus record area; and redundantly recording the high priority data in the surplus area formed by said surplus record area forming means.

8. A digital video signal recording method for directly recording a compressed transmission image signal on a magnetic tape, comprising the steps of:

dividing the image signal into high priority data and standard priority data;

causing the transmission rate of the high priority data to be lower than the transmission rate of the conventional compressed digital video signal so as to form a surplus record area; and recording the high priority data in the surplus area formed by said surplus record area forming means.

9. A digital video signal reproducing method for reproducing a digital video signal from a magnetic tape, high priority packet data and standard priority packet data being recorded on the magnetic tape, each track of the magnetic tape having a surplus record area, the high priority packet data being recorded in the surplus record area, comprising the steps of:

reproducing the high priority packet data recorded in the surplus record area in a variable speed reproduction.

10. A digital video signal recording method for redundantly recording high priority packet data of a compressed transmission image signal to a surplus record area, the surplus record area being formed by the difference between the transmission rate of the compressed transmission image signal and the transmission rate of a conventional compressed digital video signal, comprising the steps of:

recording one of two high priority packet data sets to 2n (where n is a magnification of variable speed reproduction) tracks with a first azimuth angle; and recording the other high priority packet data set to 2n tracks with a second azimuth angle.

11. The digital video signal recording method as set forth in claim 10, wherein the magnification of the variable speed reproduction is 17, the number of tracks on which the two high priority packet data sets are recorded being 36.

12. A digital video signal recording apparatus for directly recording a compressed transmission image signal on a magnetic tape, comprising:

surplus record area forming means for causing the transmission rate of the high priority data to be lower than the transmission rate of the conventional compressed digital video signal so as to form a surplus record area;

means for redundantly recording the high priority data in the surplus area formed by said surplus record area forming means;

means for recording one of two high priority packet data sets to 2n (where n is a magnification of variable speed reproduction) tracks with a first azimuth angle; and means for recording the other high priority packet data set to 2n tracks with a second azimuth angle.

13. The digital video signal recording apparatus as set forth in claim 12, wherein the magnification of the variable speed reproduction is 17, the number of tracks on which the two high priority packet data sets are recorded being 36.

14. A digital video signal recording apparatus for directly recording a transmitted image signal on a magnetic tape, the image signal being divided into a plurality of high priority packets and a plurality of standard priority packets, said apparatus comprising:

surplus recording area means for dividing and positioning a surplus recording area on said tape that results from a difference between a data transmission rate of the image signal and a rate of recording on the magnetic tape; and recording means for redundantly recording the high priority packets in said surplus recording area.

15. A digital video signal recording apparatus according to claim 14, wherein said surplus recording area is divided into a plurality of variable speed reproduction areas positioned on said magnetic tape to be reproduced during a variable speed reproduction operation.

16. A digital video signal recording apparatus for directly recording a transmitted image signal on a magnetic tape, said apparatus comprising:

dividing means for dividing the transmitted image signal into a plurality of high priority packets and a plurality of standard priority packets;

surplus recording area means for dividing and positioning a surplus recording area on said tape resulting from a difference between a data transmission rate of the image signal and a rate of recording on the magnetic tape; and recording means for redundantly recording the high priority packets in said surplus recording area.

17. A digital video signal recording apparatus according to claim 16, wherein the transmitted image signal is compressed according to MPEG2.

* * * * *